United States Patent
Knapp et al.

(10) Patent No.: US 12,234,098 B2
(45) Date of Patent: Feb. 25, 2025

(54) CONVEYING SYSTEM FOR LONGITUDINALLY TRANSPORTING ELONGATE ITEMS

(71) Applicant: SPRINGER MASCHINENFABRIK GMBH, Friesach (AT)

(72) Inventors: Florian Knapp, St. Blasen (AT); Julian Pötscher, St. Veit an der Glan (AT)

(73) Assignee: SPRINGER MASCHINENFABRIK GMBH, Friesach (AT)

( * ) Notice: Subject to any disclaimer, the term of this patent is extended or adjusted under 35 U.S.C. 154(b) by 0 days.

(21) Appl. No.: 18/702,901

(22) PCT Filed: Oct. 13, 2022

(86) PCT No.: PCT/EP2022/078489
§ 371 (c)(1),
(2) Date: Apr. 19, 2024

(87) PCT Pub. No.: WO2023/066781
PCT Pub. Date: Apr. 27, 2023

(65) Prior Publication Data
US 2024/0327128 A1     Oct. 3, 2024

(30) Foreign Application Priority Data

Oct. 20, 2021  (AT) ............... A 50834/2021
Oct. 20, 2021  (AT) ............... A 50835/2021
Feb. 25, 2022  (AT) ............... A 50126/2022

(51) Int. Cl.
*B65G 17/00*    (2006.01)
*B65G 15/12*    (2006.01)
(Continued)

(52) U.S. Cl.
CPC .......... *B65G 17/002* (2013.01); *B65G 15/12* (2013.01); *B65G 15/14* (2013.01); *B65G 17/36* (2013.01);
(Continued)

(58) Field of Classification Search
CPC ...... B65G 17/002; B65G 15/14; B65G 21/02; B65G 45/10; B65G 2201/0217;
(Continued)

(56) References Cited

U.S. PATENT DOCUMENTS

| | | |
|---|---|---|
| 503,908 A | 8/1893 | Hahn |
| 1,084,376 A | 1/1914 | Sykes |

(Continued)

FOREIGN PATENT DOCUMENTS

| | | | |
|---|---|---|---|
| AT | 343539 B | | 6/1978 |
| CN | 209109632 U | * | 7/2019 |

(Continued)

OTHER PUBLICATIONS

Translation DE 30 24 699 (Year: 2024).*
(Continued)

*Primary Examiner* — Mark A Deuble
(74) *Attorney, Agent, or Firm* — Liang & Hennessey LLP; Brian Hennessey

(57) ABSTRACT

A conveying system for longitudinally transporting elongate items, including a circulating traction belt and a supporting structure for the circulating traction belt, wherein a plurality of supports are connected by means of at least one traction element to form the circulating traction belt, wherein each of the supports comprises an indentation for supporting the elongate item. Each of the supports is fastened at at least two spaced-apart fastening points to the at least one traction element and the circulating traction belt is mounted, at least (Continued)

in a conveying region of the conveying system, by rollers so as to be movable with respect to the supporting structure.

15 Claims, 10 Drawing Sheets

(51) Int. Cl.
*B65G 15/14* (2006.01)
*B65G 17/36* (2006.01)
*B65G 21/02* (2006.01)
*B65G 21/22* (2006.01)
*B65G 41/00* (2006.01)
*B65G 45/10* (2006.01)
*B65G 47/46* (2006.01)
*B65G 47/82* (2006.01)

(52) U.S. Cl.
CPC ............. *B65G 21/02* (2013.01); *B65G 21/22* (2013.01); *B65G 41/002* (2013.01); *B65G 45/10* (2013.01); *B65G 47/46* (2013.01); *B65G 47/82* (2013.01); *B65G 2201/0217* (2013.01); *B65G 2201/0282* (2013.01)

(58) Field of Classification Search
CPC ...... B65G 17/02; B65G 17/065; B65G 17/12; B65G 17/14; B65G 17/36
See application file for complete search history.

(56) References Cited

U.S. PATENT DOCUMENTS

| | | | | |
|---|---|---|---|---|
| 3,608,700 A | * | 9/1971 | Nilsson | B65G 17/323 198/794 |
| 3,960,267 A | | 6/1976 | Valo | |
| 4,353,276 A | * | 10/1982 | Ackerfeldt | B27B 31/00 414/746.3 |
| 4,801,002 A | * | 1/1989 | Gonner | B65G 17/067 198/698 |
| 2006/0037450 A1 | | 2/2006 | Pobuda et al. | |
| 2010/0200118 A1 | | 8/2010 | Krauss et al. | |
| 2011/0201241 A1 | | 8/2011 | Rubino | |
| 2016/0129606 A1 | | 5/2016 | Griffin et al. | |

FOREIGN PATENT DOCUMENTS

| | | |
|---|---|---|
| DE | 2014857 A1 | 3/1971 |
| DE | 2427901 A1 | 12/1975 |
| DE | 2749033 B1 | 3/1979 |
| DE | 3024699 A1 | 1/1982 |
| EP | 0203898 A2 | 12/1986 |
| EP | 1787775 A1 | 5/2007 |
| EP | 2166351 A1 | 3/2010 |
| EP | 2369340 A1 | 9/2011 |
| GB | 372480 A | 5/1932 |
| GB | 737342 A | 9/1955 |
| GB | 2345026 A | 6/2000 |
| SU | 479700 A1 | 8/1975 |
| SU | 891541 A1 | 12/1981 |
| WO | 2007011296 A1 | 1/2007 |
| WO | 2021159159 A1 | 8/2021 |

OTHER PUBLICATIONS

Translation CN 209109632 (Year: 2024).*
Austria Application No. A 50126/2022, Office Action mailed Jul. 8, 2022, 6 pages.
International Application No. PCT/EP2022/078489, International Search Report and Written Opinion mailed Feb. 10, 2023, 22 pages.
International Application No. PCT/EP2022/078489, International Preliminary Report mailed Jan. 31, 2024, 16 pages.

* cited by examiner

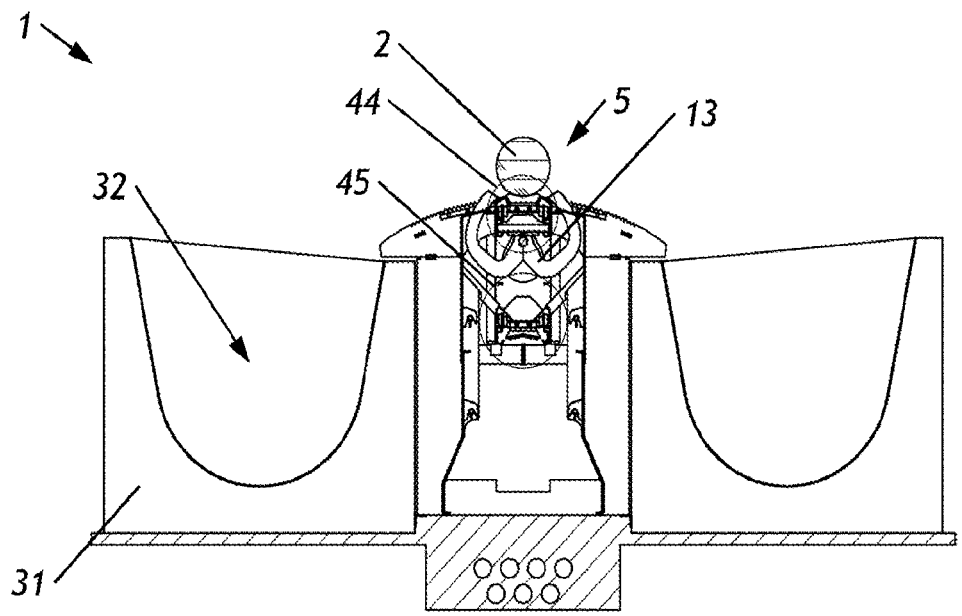
FIG. 5
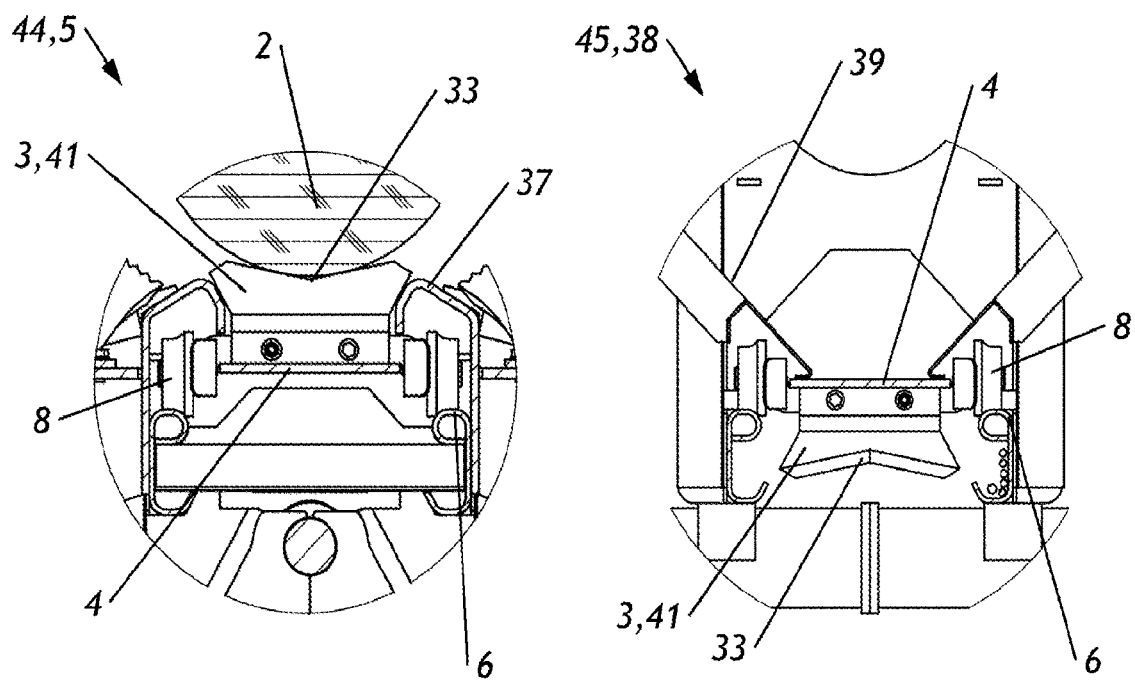
FIG. 6
FIG. 7

CONVEYING SYSTEM FOR LONGITUDINALLY TRANSPORTING ELONGATE ITEMS

CROSS-REFERENCE TO RELATED APPLICATIONS

The present application is a national phase application of PCT Application No. PCT/EP2022/078489, filed Oct. 13, 2022, entitled "CONVEYING SYSTEM FOR LONGITUDINALLY TRANSPORTATING ELONGATE ITEMS", which claims the benefit of Austrian Patent Application Nos. A 50834/2021, filed Oct. 20, 2021, and A 50835/2021 filed Oct. 20, 2021, each of which is incorporated by reference in its entirety.

BACKGROUND OF THE INVENTION

1. Field of the Invention

The invention relates to a conveying system for longitudinally transporting elongated items with a revolving traction belt and a supporting structure for the revolving traction belt.

2. Description of the Related Art

It is known that conveying systems are used for transporting conveyed goods. As is known, a distinction is drawn between the conveyed goods, for example piece goods and bulk goods, with the conveying systems being adapted to the specific properties of the conveyed goods. Conveying systems for transporting elongated items are often used in wood processing operations. In sawmills, for example, logs can be transported to wood-processing machines via conveying systems and processed into sawn timber.

GB 737 342 A discloses a conveying system with a plurality of conveyor carriages, which conveyor carriages are connected to one another by means of coupling elements and to which conveyor carriages a conveyor belt is fastened.

EP 0 203 898 A2 discloses a conveyor line with pallets for conveying heavy loads, comprising two guide segments mounted so that they are able to pivot around a vertical axis, which are each guided in a path defined by guide walls.

US 2010/200118 A1 discloses a log conveying system comprising a conveyor belt and two conveyor rails with two sliding surfaces. A plurality of supports are fastened to the conveyor belt, which supports have a recess for receiving a log.

Conveying systems or longitudinal conveyors are often used in sorting systems such as a log sorting system to transport elongated items along the conveying direction. Such conveying systems usually have a sliding guide for carriers guided on a chain. The elongated items conveyed by the conveying systems are sorted on a sorting line according to predetermined criteria, whereby the sorted elongated items can be ejected from the conveying systems into sorting containers.

A disadvantage of the conveying systems known to date is that the conveying systems must be operated with an excessive drive power on the one hand in order to have reserves available for uneven loading of elongated items on the longitudinal sorting line and the other hand to have sufficient power available for starting up the conveying systems and for allowing them to coast. Due to the sliding guidance of the carriers guided on the chain, conventional conveying systems are also usually equipped with central oil lubrication in order to keep the friction between the moving parts as low as possible. Since such centralized oil lubrication systems are not sealed off from the environment or the installation site of the conveying systems, a large part of the lubricating oil used can enter the environment and contaminate it.

Another disadvantage of currently known conveying systems, in particular conveying systems for log sorting systems, is that there are non-uniform gaps between the elongated items transported by the conveying systems. Such non-uniform gaps are usually caused by an undefined transfer of the elongated items from the transverse transport to the longitudinal transport by means of a receiving unit of a sorting system. For this reason, conventional conveying systems usually comprise various sensors for measuring the gaps between the elongated items, whereby the conveyor speeds of the conveying systems are adjusted in such a way that these gaps are standardized or harmonized.

SUMMARY OF THE INVENTION

The object of the invention, therefore, is to disclose a conveying system of the type mentioned at the beginning with which the above-mentioned disadvantages can be avoided and with which elongated items can be conveyed in an environmentally friendly and efficient manner in the longitudinal transport.

This achieves the advantage that a conveying system can be provided with which elongated items can be transported in the longitudinal transport direction in an environmentally friendly and efficient manner. The combination of the at least one traction element and the movable support of the revolving traction belt by means of rollers in the conveying region means that it is possible to completely eliminate the use of oil lubrication on exposed parts of the conveying system, which means that it is also possible to reduce the maintenance expense of the conveying system and the ongoing operating costs of the conveying system. This also means that no oil can escape into the environment at the installation site of the conveying system, which prevents environmental contamination. Due to the revolving traction belt being supported so that it is able to move relative to the support structure by means of rollers in the conveying region, the conveying system can also be operated with a lower drive power than a conveying system with chain-guided carriers, whereby the conveying speed of the conveying system can still be elevated compared to a chain-operated conveying system. The fact that each support is connected to the at least one traction element in at least two spaced-apart fastening points means that a high torsional rigidity of the revolving traction belt in relation to impacts and laterally acting forces can be achieved by means of the simplest possible design, whereby it is possible to eliminate a complex guidance of the supports along the longitudinal transport direction in the conveying region. The movable support of the revolving traction belt in the conveying region by means of rollers also has the advantage that the noise pollution of the conveying system during a conveying process is significantly reduced in contrast to a conveying system with chain-guided carriers, whereby residents and workers who live or work in the vicinity of such a conveying system are exposed to significantly less noise pollution than with chain-guided conveying systems. In addition, the movable support of the revolving traction belt by means of rollers in the conveying region can also reduce the friction between the revolving traction belt and the supporting structure compared to a conveying system with chain-guided carriers, thereby extending the service life of the conveying system compared to previously known conveying systems and reducing energy costs for operating the conveying system. The combination of the at least one traction element and the rollers achieves an additional synergy effect, which makes the conveying system much easier to set up and maintain. As a result, parts of the conveying system can already be installed in a delivery unit in a production system, making it advantageously easier to replace parts of the conveying system in comparison to a conveying system with chain-guided carriers.

The dependent claims relate to further advantageous embodiments of the invention.

Express reference is hereby made to the wording of the claims, whereby the claims are inserted into the description at this point by reference and are deemed to be reproduced verbatim.

BRIEF DESCRIPTION OF THE DRAWINGS

The invention will be described in greater detail with reference to the accompanying drawings in which only preferred embodiments are shown by way of example. In the drawings:

FIG. 5 shows a sectional view along line AA through the first preferred embodiment of the conveying system shown in FIG. 4, FIG. 6 shows a first detail from FIG. 5 of the first preferred embodiment of the conveying system, FIG. 7 shows a second detail from FIG. 5 of the first preferred embodiment of the conveying system.

DETAILED DESCRIPTION

Figure 1:
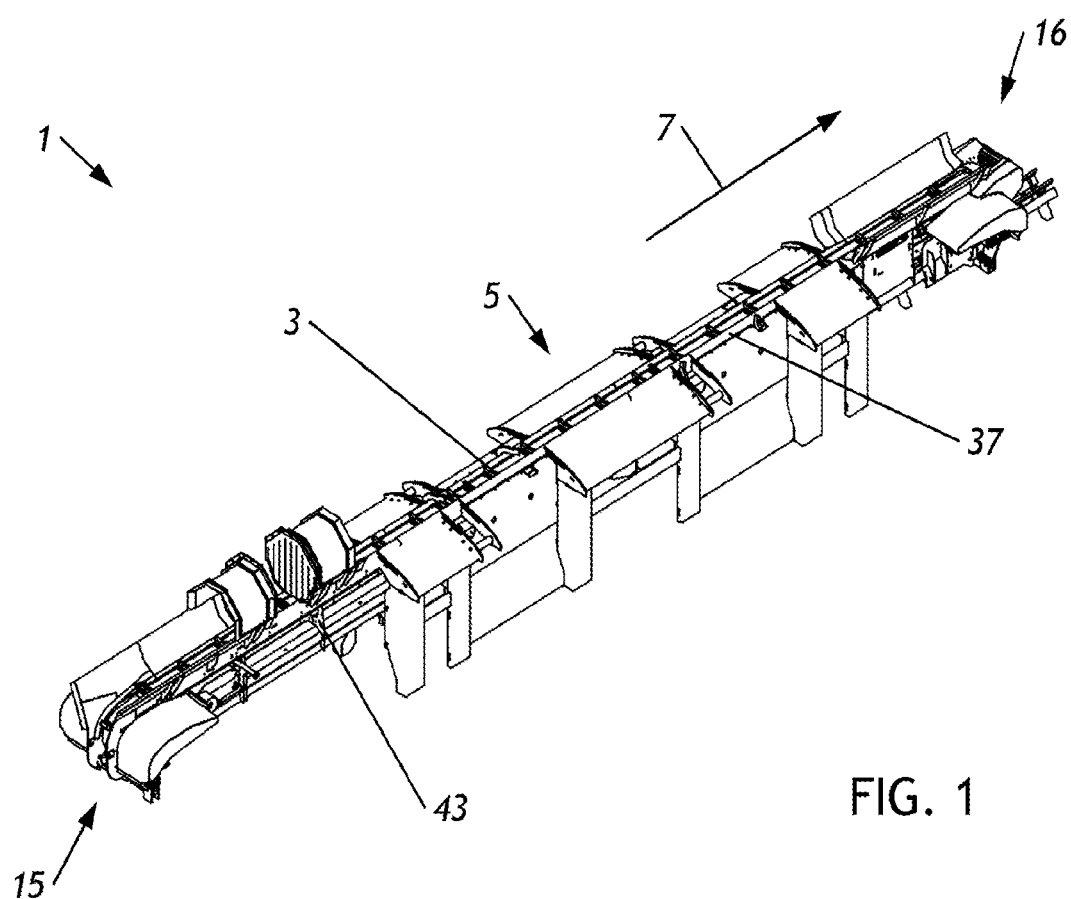
FIG. 1 is an axonometric depiction of a first preferred embodiment of a conveying system for longitudinally transporting elongated items.

FIGS. 1 to 13 show at least parts of a first and a second preferred embodiment of a conveying system 1 for longitudinally transporting elongated items 2 with a revolving traction belt and a supporting structure 43 for the revolving traction belt, wherein several supports 3 are connected to the revolving traction belt by means of at least one traction element 4, wherein each of the supports 3 has a recess 33 for supporting the elongated items 2, wherein each of the supports 3 is fastened to the at least one traction element 4 in at least two spaced-apart fastening points 34, wherein the revolving traction belt is supported so that it is able to move relative to the supporting structure 43 by means of rollers 8 at least in a conveying region 5 of the conveying system 1.

A sorting system with at least one conveying system 1 is also provided. This achieves the advantage that a conveying system 1 can be provided with which elongated items 2 can be transported in the longitudinal transport direction 7 in an environmentally friendly and efficient manner. The combination of the at least one traction element 4 and the movable support of the revolving traction belt by means of rollers 8 in the conveying region 5 means that it is possible to completely eliminate the use of oil lubrication on exposed parts of the conveying system 1, which also makes it possible to reduce the maintenance expense of the conveying system 1 and the ongoing operating costs of the conveying system 1. This also means that no oil can escape into the environment at the installation site of the conveying system 1, which prevents environmental contamination. The movable support of the revolving traction belt relative to the supporting structure 43 by means of rollers 8 in the conveying region 5 means that the conveying system 1 can also be operated with a lower drive power than a conveying system with chain-guided carriers; the conveying speed of the conveying system 1 can nevertheless be increased in comparison to a chain-driven conveying system. The fact that each support 3 is fastened to the at least one traction element 4 in at least two spaced-apart fastening points 34 makes it possible to achieve a high torsional rigidity of the revolving traction belt in relation to impacts and laterally acting forces by means of the simplest possible design, whereby it is possible to eliminate a complex guidance of the supports 3 along the longitudinal transport direction 7 in the conveying region 5. The movable support of the revolving traction belt by means of rollers 8 in the conveying region 5 also has the advantage that the noise pollution of the conveying system 1 during a conveying process is significantly reduced in contrast to a conveying system with chain-guided carriers, whereby residents and workers who live or work in the vicinity of such a conveying system 1 are exposed to significantly less noise pollution than with chain-guided conveying systems. Furthermore, the movable support of the revolving traction belt by means of rollers 8 in the conveying region 5 can also reduce the friction between the revolving traction belt and the supporting structure 43 compared to a conveying system with chain-guided carriers, which extends the service life of the conveying system 1 compared to previously known conveying systems and reduces energy costs for operating the conveying system 1. The combination of the at least one traction element 4 and the rollers 8 results in a further synergy effect, which significantly simplifies the maintenance and assembly of the conveying system 1. This means that parts of the conveying system 1 can already be installed in a delivery unit in a production system, which also makes it easier to replace parts of the conveying system 1 compared to a conveying system with chain-guided carriers.

The conveying system 1 is an apparatus that is embodied to convey elongated items 2 in the longitudinal transport direction 7.

Elongated items 2 are understood to mean any type of piece goods that have elongated dimensions. Preferably, a first side of an elongated item 2, which extends along the longitudinal transport direction 7, is longer than a second side of the elongated item 2 oriented transversely to the longitudinal transport direction 7.

The elongated items 2 are preferably made of wood.

The elongated items 2 are preferably elongated pieces of wood.

Alternatively, the elongated items 2 can also be made of a polymer and/or a metal.

Preferably, the elongated items 2 comprise boards, slats, strips, and/or beams.

Particularly preferably, the elongated items 2 comprise wooden boards, wooden slats, wooden strips, wooden beams, and/or round timbers.

It is provided that the conveying system 1 comprises a revolving traction belt and a supporting structure 43 for the revolving traction belt. A traction belt is, in particular, a horizontal component subjected to tensile stress. It is provided that the supporting structure 43 supports the revolving traction belt and holds it in position.

Preferably, it is provided that the elongated items 2 are placed onto the supports 3 and transported in the longitudinal transport direction 7.

Preferably, the elongated items 2 can be transported in the longitudinal transport direction 7 by means of multiple movably mounted supports 3.

The supports 3 can preferably also be referred to as carriers.

Figure 3:
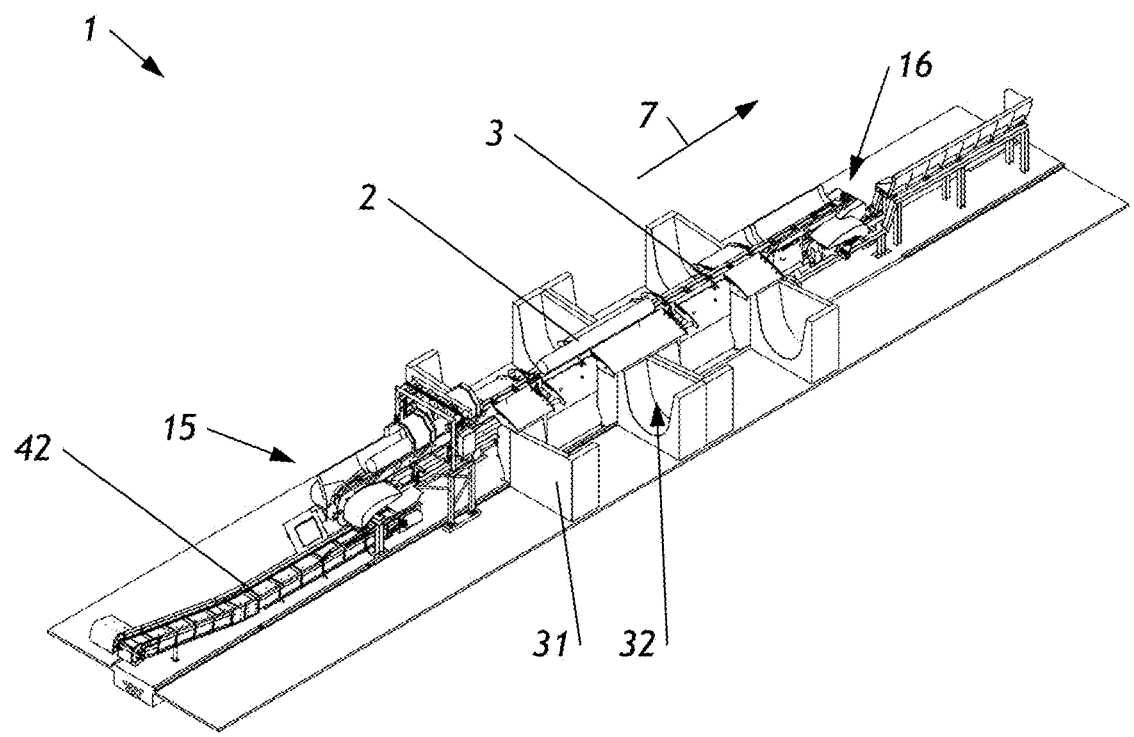
FIG. 3 is an axonometric depiction of the first preferred embodiment of the conveying system as part of a sorting system.
Figure 4:
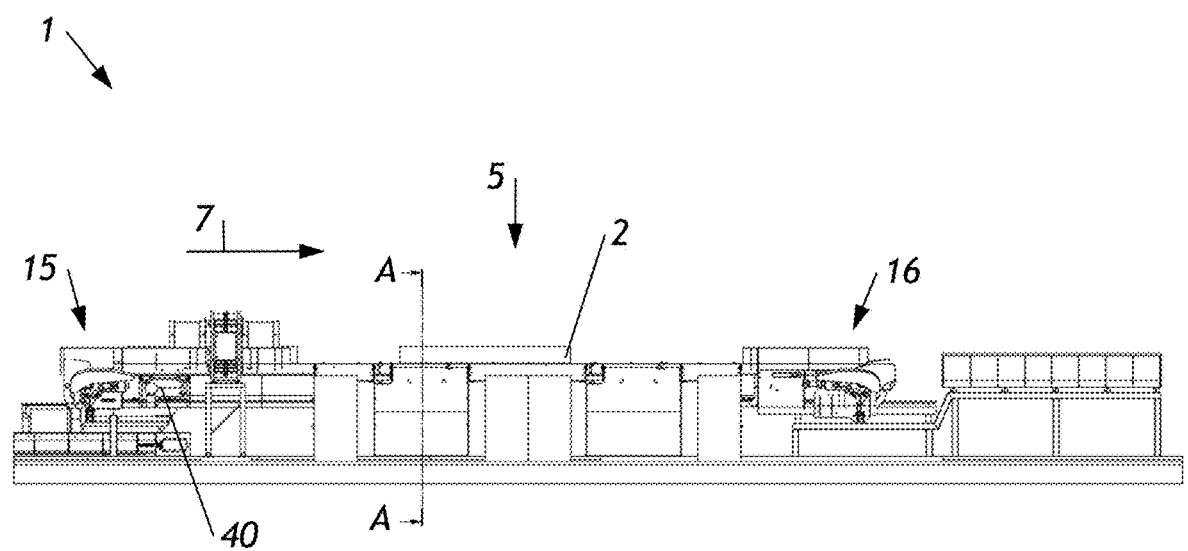
FIG. 4 shows an at least partial side view of the first preferred embodiment of the conveying system shown in FIG. 3 as part of the sorting system.

In particular, the longitudinal transport direction 7 is the direction along which the elongated items 2 are conveyed or transported by the conveying system 1. Particularly preferably, the longitudinal transport direction 7 can also be referred to as the conveying transport direction. In FIG. 3 and FIG. 4, for example, in the first preferred embodiment of the conveying system 1, the elongated items 2 are shown being conveyed in the longitudinal transport direction 7. FIG. 3 shows an axonometric depiction of the first preferred embodiment of the conveying system 1 and FIG. 4 shows a side view of the first preferred embodiment of the conveying system 1. Furthermore, FIG. 4 shows the section line A-A, which section line A-A indicates a section perpendicular to the longitudinal transport direction 7. FIG. 5 shows the section A-A of the section line A-A shown in FIG. 4. In FIG. 5, for example, the first preferred embodiment of the conveying system 1 is shown, whereby an elongated item 2 is transported in the longitudinal transport direction 7 in the conveying region 5.

Preferably, the elongated item 2 rests on at least two supports 3 in the conveying region 5. In FIG. 6, for example, the first detail from FIG. 5 of the first preferred embodiment of the conveying system 1 is shown, wherein an elongated item 2 is transported in the longitudinal transport direction 7 in the conveying region 5.

Preferably, it can be provide that the supports 3 are movably mounted.

Figure 12:
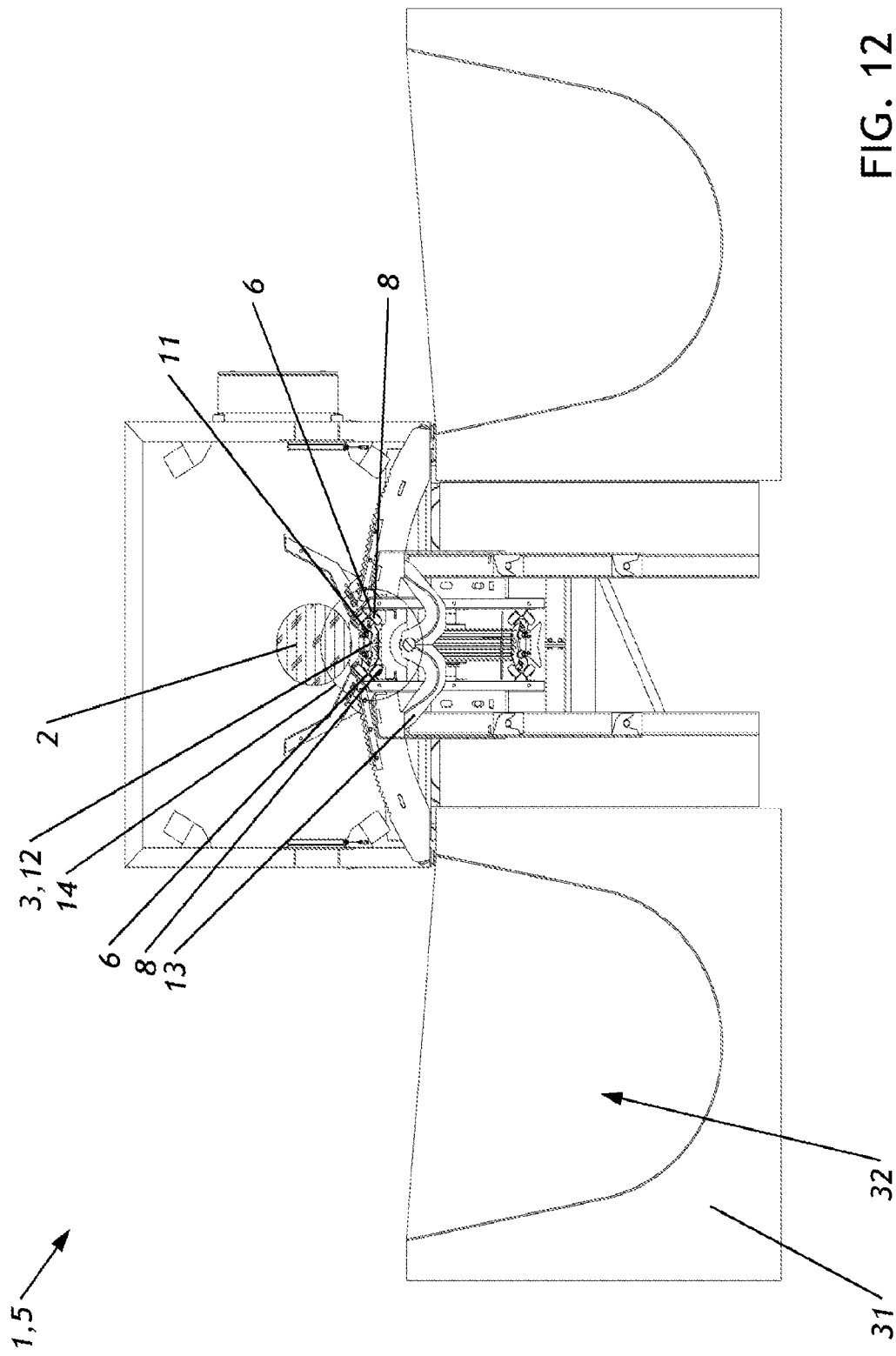
FIG. 12 shows a sectional view perpendicular to the longitudinal transport direction of the second preferred embodiment of the conveying system.
Figure 13:
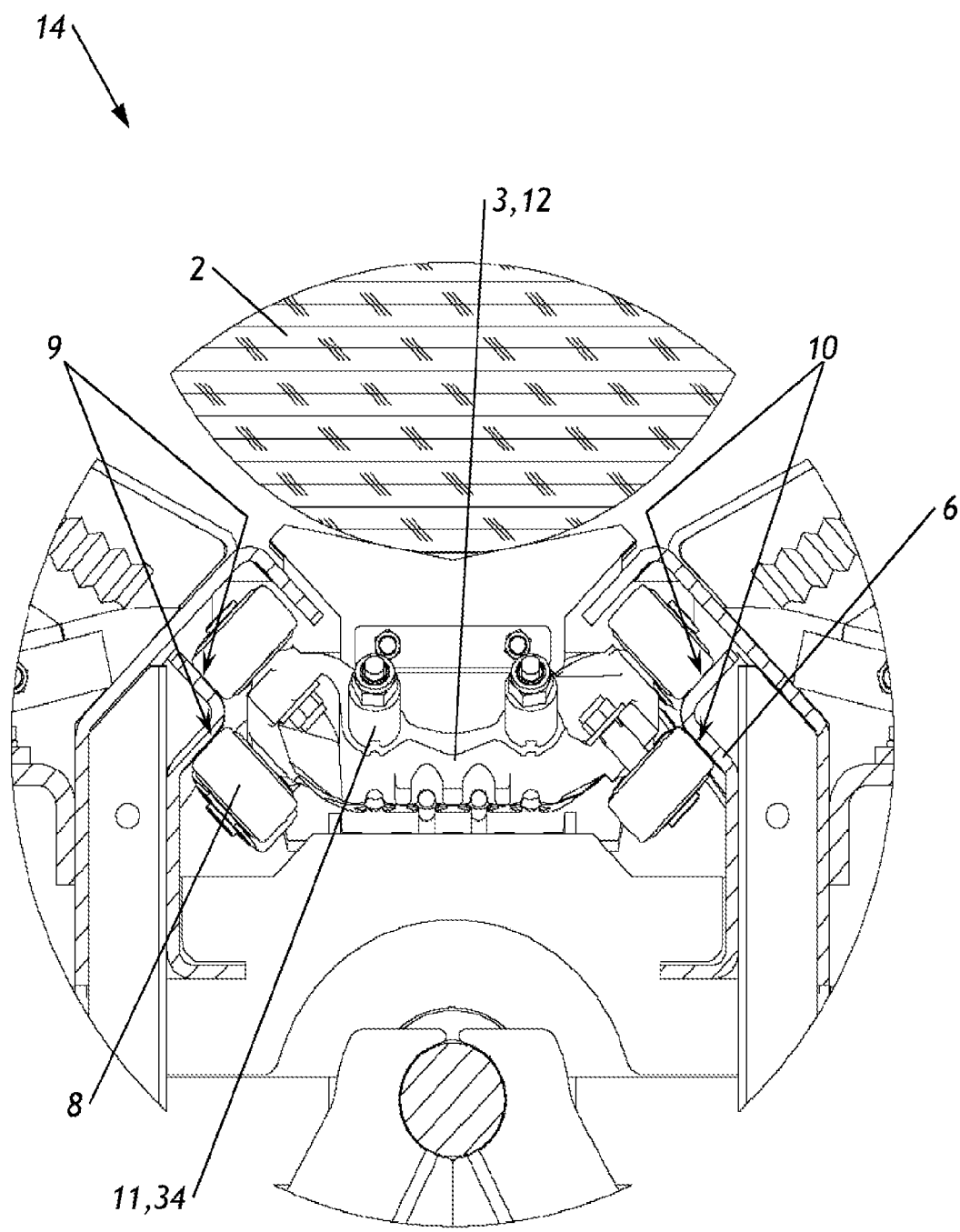
FIG. 13 shows a detail from FIG. 12 of the second preferred embodiment of the conveying system for longitudinally transporting elongated items.

Preferably, the support 3, in particular at least some of the multiple movably mounted supports 3, have six sides, wherein an upper side of the support 3 has the recess 33 for the at least one elongated item 2, wherein a lower side of the support 3 is positioned opposite and spaced apart from the upper side of the support 3, wherein a front side of the support 3 is positioned in the longitudinal transport direction 7, wherein a rear side of the support 3 is positioned opposite and spaced apart from the front side of the support 3, wherein in each case a narrow side of the support 3 is positioned orthogonally to the longitudinal transport direction 7. FIG. 13 shows an example of a detail from FIG. 12 of the second preferred embodiment of the conveying system 1 for longitudinally transporting elongated items, whereby the movable support of a support 3 by means of rollers 8 is shown.

Preferably, it can be provided that a first end surface of the support 3 is positioned at the front of the support 3.

Preferably, a second end surface of the support 3 can be positioned at the back of the support 3.

Preferably, it can be provided that each of the supports 3 comprises a base body, in particular a steel base body. The base body, in particular the steel base body, can preferably be embodied in the form of a welded construction.

It is provided that each of the supports 3 has a recess 33 for the elongated item 2. It is preferably provided that the recess 33 is embodied in such a way that the elongated item 2 does not slip or roll laterally off the supports 3 during transportation of the elongated items 2 in the longitudinal transport direction 7.

Preferably, it can be provided that each of the supports 3 comprises a support unit 41 for the elongated items 2. In particular, it can be provided that the support unit 41 has the recess 33 for the elongated items 2.

In particular, the recess 33 for the elongated items 2 can be embodied as V-shaped.

Preferably, the support unit 41 can be made of a polymer, in particular plastic, and/or a metal. A person skilled in the art is aware of the polymers and/or metals that can be used as the support unit 41, which makes it unnecessary for the polymers and/or metals that can be used as the support unit 41 to be listed here.

Preferably, it can be provided that each support unit 41 of the support 3 is positively connected to the base body of the support 3.

Preferably, it can be provided that each support unit 41 is fastened to the base body of each support 3, in particular to the steel base body of each support 3. Preferably, each support unit 41 can be fastened to the base body, in particular to the steel base body, of each support 3 by means of screws.

Preferably, an upper side of the support unit 41 can have the recess 33 for the elongated items 2. Preferably, an underside of the support unit 41 can be connected to the revolving traction belt. Preferably, it can be provided that the base body of the support 3 and the underside of the support unit 41 of the support 3 are connected to the revolving traction belt. Particularly with the fastening of the support unit 41 to the base body of the support 3, this achieves the advantage that the support 3 is connected to the revolving traction belt by means of a wide support surface, whereby in particular a twisting of the revolving traction belt can be effectively counteracted when the elongated items 2 are being placed onto and/or ejected from it.

Preferably, it can be provided that the recess 33 for placing the elongated item 2 directly on the support 3 is formed. In particular, it can be provided that the support 3 is formed in one piece.

It is provided that the supports 3 are connected to a revolving traction belt by means of at least one traction element 4.

It is provided that the supports 3 are each fastened to the at least one traction element 4 in at least two spaced-apart fastening points 34. This achieves the advantage that a high torsional rigidity of the revolving traction belt in relation to impacts and laterally acting forces can be achieved by means of the simplest possible construction, whereby it is possible to eliminate a complex guidance and alignment of the supports 3 along the longitudinal transport direction 7 in the conveying region 5. In FIG. 13, the at least two spaced-apart fastening points 34 on the second preferred embodiment of the conveying system 1 are shown, wherein the at least two spaced-apart fastening points 34 for the first preferred embodiment of the conveying system 1 are not visible in FIGS. 1 to 10.

Preferably, it can be provided that the at least two spaced-apart fastening points 34 have a predefined distance from one another. Preferably, it can be provided that the at least two spaced-apart fastening points 34 are positioned at predeterminable distances from one another. In particular, it is provided that at least two first spaced-apart fastening points 34 are positioned at a predeterminable distance from at least two second spaced-apart fastening points 34. This achieves the advantage that the conveying system 1 can be individually adapted to the length of the elongated items 2 to be transported.

Preferably, it can be provided that the at least two spaced-apart fastening points 34 are positioned on the supports 3. FIG. 13 shows the arrangement of the two spaced-apart fastening points 34 in the second preferred embodiment of the conveying system 1.

Preferably, it can be provided that the at least two spaced-apart fastening points 34 are positioned on the least one traction element 4.

Preferably, it can be provided that a connecting line through the at least two fastening points 34 is oriented transversely, in particular orthogonally, to the longitudinal transport direction 7 of the conveying system 1. This results in the particular advantage that a particularly torsionally rigid mounting of the supports 3 on the at least one traction element 4 can be achieved. As a result, the revolving traction belt can be protected from powerful lateral forces, particularly when the elongated items 2 are placed onto the supports 3 or when the elongated items 2 are ejected from the supports 3. In the event of damage to a support 3, this also makes it possible to quickly and easily replace just the damaged support 3.

It can preferably be provided that the at least one traction element 4 comprises at least one traction cable. In particular, it can be provided that several traction cables are positioned parallel to one another. In particular, it can be provided that two traction cables are positioned parallel to one another. In this case, it can in particular be provided that the traction cables positioned parallel to each other are positioned in the longitudinal transport direction 7. In particular here, it can be provided that several supports 3 are connected to a revolving traction belt by means of the parallel traction cables.

Particularly preferably, it can be provided that the at least one traction element 4 is embodied in the form of a traction cable.

Particularly preferably, it can be provided that the at least one traction element 4 is embodied in the form of a belt. In particular, the belt can also be referred to as a belt conveyor or elevator belt. This results in the particular advantage that debris such as pieces of wood can be transported out of the conveying region 5 by means of the belt. The embodiment of the at least one traction element 4 in the form of a belt also advantageously achieves a high torsional rigidity of the revolving traction belt. As a result, twisting of the revolving traction belt can be avoided, particularly when the elongated items 2 are being placed onto or ejected from the conveying system 1.

When the at least one traction element 4 is embodied in the form of a belt, it can particularly preferably be provided that the belt is wider than the elongated items 2.

Preferably, it can be provided that the at least one traction element 4 is made of a composite material. This achieves the advantage that a higher wear resistance can be achieved than with a conventional belt. This also achieves the advantage that the belt tension in the conveying system 1 can be kept constant even over longer operating times of the conveying system 1 since this reduces the elongation of the belt. This can also effectively counteract the propagation of cracks in the belt.

Preferably, it can be provided that the belt, in particular the elevator belt, comprises a steel cable. In particular, the belt, especially the elevator belt, can comprise a steel cord carcass. In particular, it can be provided that the steel cable or steel cord carcass is positioned inside the belt. In particular, the steel cable or steel cord carcass can be embedded in the belt. The steel cord carcass can preferably comprise first carcass steel cords in the longitudinal transport direction 7 and second carcass steel cords transverse to the longitudinal transport direction 7, wherein the cross-sectional area of the first carcass steel cords can be larger than the cross-sectional area of the second carcass steel cords. This can advantageously increase the strength and rigidity, in particular the impact resistance, of the belt since the carcass is the load-bearing framework of the belt.

Particularly preferably, it can be provided that each of the supports 3 is fastened to the belt, in particular the elevator belt. Preferably, it can be provided that each of the supports 3 is fastened to the belt by means of screws, in particular elevator screws. In particular, it can be provided that each of the supports 3 is fastened to the belt in at the at least two spaced-apart fastening points 34.

Figure 2:
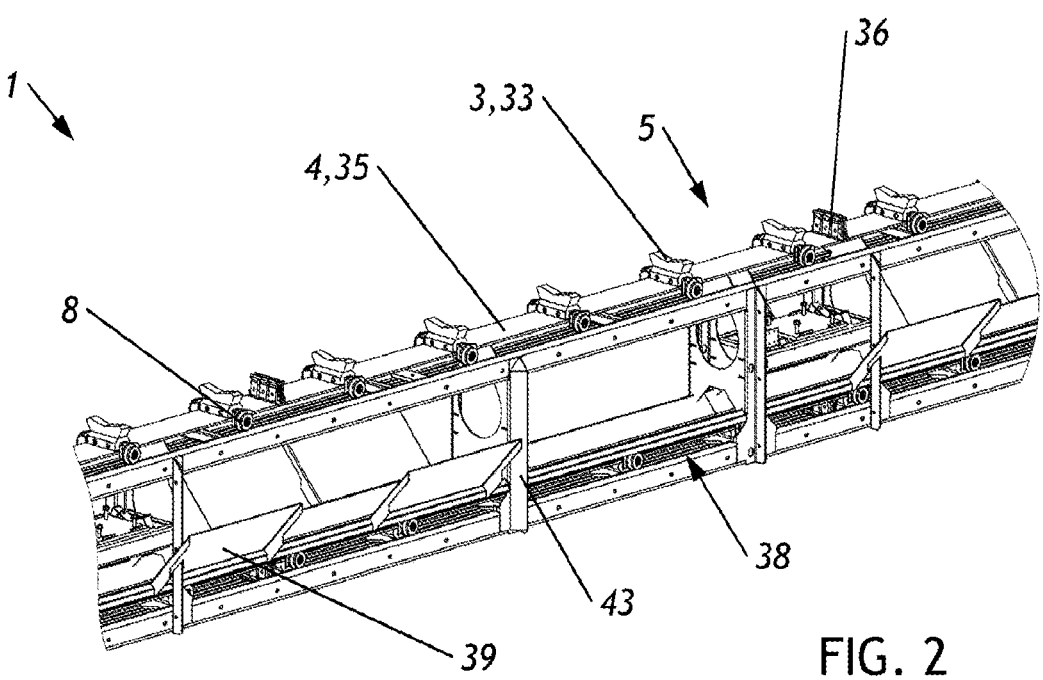
FIG. 2 is an axonometric depiction of a detail of the first preferred embodiment of the conveying system shown in FIG. 1.

Preferably, it can be provided that the at least one traction element 4 is composed of segments 35, which segments 35 are detachably coupled to one another by means of a connector 36. This achieves the advantage that there is no need for on-site vulcanization, that damaged components can be easily replaced, and that a flexible design can be achieved for conveying systems 1 of different sizes. This also makes it possible to avoid high maintenance costs because it is only necessary to replace the damaged segment or segments 35. FIG. 2, for example, shows an axonometric depiction of a detail of the first preferred embodiment of the conveying system 1; in the conveying region 5, three segments 35 of the at least one traction element 4 are shown, which are detachably coupled to one another by means of two connectors 36.

Preferably, it can be provided that the connector 36 is made of a metal, in particular aluminum.

Preferably, it can be provided that the connector 36 consists of several parts.

In particular, it can be provided that the movably mounted supports 3 are connected to a revolving traction belt by means of at least one traction cable 4. In particular, it can be provided that the revolving traction belt is formed by the supports 3 connected to the at least one traction element 4.

The revolving traction belt is preferably closed.

It is provided that the revolving traction belt is supported so that it is able to move relative to the supporting structure 43 by means of rollers 8, at least in the conveying region 5 of the conveying system 1.

In particular, the rollers 8 can also be referred to as castors.

Preferably, it can be provided that the rollers 8 for supporting the revolving traction belt so that it is able to move relative to of the support structure 43 are positioned against the revolving traction belt. A secure guidance of the revolving traction belt can thus be achieved, making it possible to prevent the revolving traction belt from slipping off from the supporting structure 43. FIG. 6 shows the first detail from FIG. 5, for example in the first preferred embodiment of the conveying system 1, depicting an embodiment of the support of the revolving traction belt so that it is able to move relative to the supporting structure 43.

Preferably, it can be provided that each of the supports 3 comprises at least two rollers 8 for supporting the revolving traction belt so that it is able to move relative to the supporting structure 43. This achieves the advantage that the supports 3 can be guided in a predeterminable manner by means of the at least two rollers 8. This can also advantageously prevent the revolving traction belt from sagging while transporting the elongated items 2 since the support 3, which carries or transports the elongated items 2 in the conveying region 5, is mounted so that it is able to move relative to the supporting structure 43 via the at least two rollers 8. A secure guidance of the revolving traction belt can thus be achieved, making it possible to prevent the revolving traction belt from slipping off from the supporting structure 43.

Particularly preferably, it can be provided that each of the supports 3 comprises only two rollers 8 for supporting the revolving traction belt so that it is able to move relative to the support structure 43.

Particularly preferably, it can be provided that the at least two rollers 8 of each support 3 are guided in at least one guide rail 6, in particular two guide rails 6, in the longitudinal transport direction 7 in order to support the revolving traction belt so that it is able to move relative to the supporting structure 43 in the conveying region 5. In particular, one roller 8 of the at least two rollers 8 of each support 3 can be guided in at least one guide rail 6 in order to support the revolving traction belt so that it is able to move relative to the support structure 43 in the conveying region 5.

Particularly preferably, it can be provided that the only two rollers 8 of each support 3 are guided in at least one guide rail 6, in particular two guide rails 6, in the longitudinal transport direction 7 in order to support the revolving traction belt so that it is able to move relative to the support structure 43 in the conveying region 5. Especially in combination with the fastening of each of the supports 3 by means of the at least two spaced-apart fastening points 34, this achieves the advantage that a torsionally rigid structure of the revolving traction belt can be achieved in a particularly simple and rapid way.

Preferably, it can be provided that the base body of the support 3 comprises extensions for the rollers, particularly on the narrow sides of the support 3. In particular, the rollers 8 can be connected to the base body of the support 3 in a form-fitting manner. In particular, the rollers can be positioned on the narrow sides of the support 3. In this case, it can particularly be provided that the rollers 8 are positioned in alignment on the narrow sides of the support 3. In particular, it can be provided that the rollers 8 are guided on the narrow sides of the support 3 in at least two guide rails 6, in particular in one guide rail 6 each.

In particular, the width of the revolving traction belt can be limited by the width of the support 3 and/or by the rollers 8 positioned on the support 3. In particular, the width of the support 3 can be the length between the two narrow sides of the support 3.

Particularly preferably, it can be provided that at least two supports 3 of the plurality of supports 3 are connected to one another by means of at least one traction element 4, in particular by means of at least one traction cable. Particularly preferably, it can be provided that at least two supports 3 of the plurality of supports 3 are connected to one another by means of at least two traction elements, in particular by means of at least two traction cables. Particularly preferably, it can be provided that at least two supports 3 are connected to one another by means of only two traction cables 4.

Particularly preferably, it can be provided that each of the supports 3 is connected to at least one traction element 4, in particular a traction cable.

In particular, it can be provided that each of the supports 3 is connected to at least two other supports 3. Preferably, it can be provided that the distance between two supports 3 is determined by the length of at least one traction element 4, in particular of at least one traction cable, between two supports 3.

Particularly preferably, the distance between at least some of the supports 3 can be the same. In particular, the distance between all of the supports 3 can be the same. This achieves the advantage that the distance between the supports 3 of the conveying system 1 can be individually adapted to the length of the elongated items 2 to be transported.

Preferably, it can be provided that in the operating state of the conveying system 1, the at least one traction element 4 is under tension and/or is placed under tension in the conveying region 5.

Particularly preferably, it can be provided that the at least one traction element 4 is embodied in the form of a traction cable; the at least one traction cable 4 can be embodied by means of a regular lay of the cable. The regular lay of the cable can also be referred to as a cross lay.

Alternatively, if the at least one traction element 4 is embodied in the form of a traction cable, then the at least one traction cable 4 can be embodied by means of a long lay of the cable.

Particularly preferably, it can be provided that in the operating state of the conveying system 1, the at least one traction element 4 is under tension and/or is placed under tension only in the conveying region 5.

In particular, it can be provided that the revolving traction belt comprises a return region 38, which is positioned opposite and spaced apart from the conveying region 5.

Preferably, it can be provided that the conveying system 1 comprises a return region 38, which is positioned opposite and spaced apart from the conveying region 5, and that the conveying system 1 comprises a debris guide 39 for diverting debris from the conveying region 5 into the return region 38. The debris guide 39 is preferably provided to divert debris from the conveying region 5 into the return region 38 via the debris guide 39. This achieves the advantage that debris, for example small fragments or bark residues, can be easily and quickly transported out of the conveying region 5, as with a chute. This also results in a synergy effect with the movable support of the revolving traction belt by means of rollers 8, which means that the conveying system 1 requires significantly less maintenance and cleaning work than a conventional conveying system with chain-guided carriers.

FIG. 2 shows an example of the debris guide 39 in the first preferred embodiment of the conveying system 1. FIG. 7 shows the first preferred embodiment of the conveying system 1 in the image detail identified with the reference numeral 45 in FIG. 5. FIG. 7 shows an example of the debris guide 39 in the return region 38 of the conveying system 1.

In particular, the debris guide 39 can be made of metal.

In particular, the debris guide 39 can have curved and/or straight surfaces.

Particularly preferably, the debris guide 39 can be shaped in such a way that debris can be guided from the conveying region 5 into the return region 38.

Particularly preferably, the debris guide 39 can be fastened to the support structure 43.

Particularly preferably, when the at least one traction element 4 is embodied in the form of a belt, it can be provided that the belt has an upper side and the supports 3 for the elongated items are fastened to this upper side of the belt. In this case, it can also preferably be provided that the belt has an underside which is positioned opposite and spaced apart from the underside of the belt. In particular, it can be provided that debris from the conveying region 5 can be guided to the underside of the belt via the debris guide 39.

Particularly preferably, the return region 38 can be positioned below the conveying region 5 in the operating state of the conveying system 1.

Preferably, it can be provided that in the operating state of the conveying system 1, the at least one traction element 4 is under tension and/or is placed under tension in the return region 38.

Preferably, it can be provided that the multiple movably mounted supports 3 are guided in the return region 38 in the opposite direction from the longitudinal transport direction 7.

In particular, it can be provided that the conveying system 1 has a longitudinal span in the longitudinal transport direction 7, with two transport direction changing regions 15, 16 defining the longitudinal span of the conveying system 1.

Figure 11:
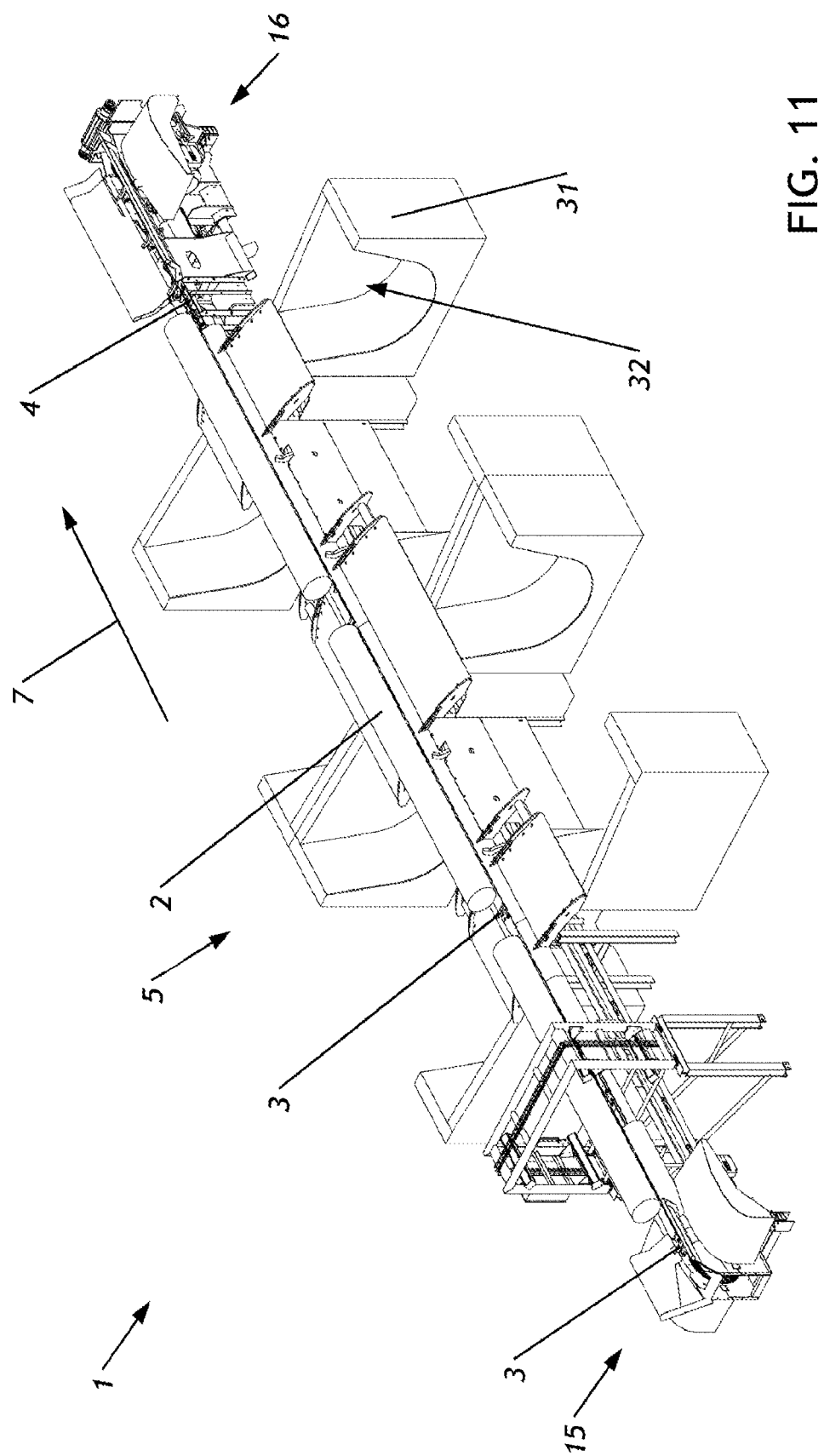
FIG. 11 is an axonometric depiction of a second preferred embodiment of the conveying system for longitudinally transporting elongated items.

In particular, it can be provided that a first transport direction changing region 15 of the conveying system 1 is positioned in a first end region of the conveying system 1 and a second transport direction changing region 16 of the conveying system 1 is positioned in a second end region of the conveying system 1, wherein the second end region of the conveying system 1 is positioned opposite and spaced apart from the first end region of the conveying system 1. Preferably, the longitudinal span of the conveying system 1 is defined by the first transport direction changing region 15 and/or the second transport direction changing region 16. In FIG. 1 and FIG. 11, the first transport direction changing region 15 is visible in the first end region of the conveying system 1 and the second transport direction changing region 16 is visible in the second end region of the conveying system 1 in both the first and second preferred embodiment of the conveying system 1.

Preferably, the first transport direction changing region 15 and the second transport direction changing region 16 comprise a first and a second direction changing device for changing the transport direction of the supports 3, in particular the plurality of movably mounted supports 3, on the at least one traction element 4 from the conveying region 5 into the return region 38. When considering a single support 3 of the plurality of movably mounted supports 3, the support 3 is guided along the revolving traction belt in such a way that the support 3 preferably comes into at least indirect contact with an elongated item 2 in the first end region of the conveying system after the first direction changing device 1 in the longitudinal transport direction 7. In particular, the elongated item 2 is placed into the recess 33 of the support 3. Then the elongated items 2 is preferably transported in the longitudinal transport direction 7 in the conveying region 5, in particular along the at least one guide rail 6. Preferably, it can be provided that the elongated item is ejected from the support 3 during transportation in the conveying region 5 of the conveying system 1. Preferably, after transporting the elongated item 2, the support 3 is guided into the return region 38 at the second transport direction changing region 16 in the second end region of the conveying system 1 by means of the second direction changing device. Then the support 3 is preferably returned in the opposite direction from the conveying direction. As a result, it can preferably be provided that the support 3 can be used again for conveying an elongated item 2 when the support 3 is guided into the conveying region 5 by the first direction changing device.

Preferably, it can be provided that the first and/or the second direction changing device is/are embodied to drive the conveying system 1. In particular, the first and/or the second direction changing device can be embodied to drive the revolving traction belt. Preferably, the first and/or the second direction changing device can comprise a motor for driving the conveying system 1.

In particular, the conveying region 5 can be positioned between the first transport direction changing region 15 and the second transport direction changing region 16. Preferably, the elongated items 2 can be transported in the conveying region 5 of the conveying system 1. Preferably, the plurality of supports 3 can be transported in the longitudinal transport direction 7 in the conveying region 5.

In particular, the return region 38 can be positioned between the first transport direction changing region 15 and the second transport direction changing region 16. Preferably, the plurality of supports 3 can be transported in the return region 38 in the opposite direction from the longitudinal transport direction 7.

Preferably, at the first end region of the conveying system 1, the elongated item 2 can be placed onto at least two movably mounted supports 3 and transported to the second end region of the conveying system 1 by means of the at least two movably mounted supports 3. Particularly preferably, the elongated item 2 can be placed onto the at least two movably mounted supports 3 with the aid of a deflecting device 17 of a sorting system. The placement of the elongated item 2 onto the at least two movably mounted supports 3 can also preferably be understood as a transfer of the elongated item 2 from the deflecting device 17 of the sorting system to the conveying system 1.

Preferably, the revolving traction belt comprises the conveying region 5, the return region 38, the first transport direction changing region 15, and the second transport direction changing region 16.

It can be provided that in the conveying region 5, the conveying system 1 comprises at least one guide rail 6 in the longitudinal transport direction 7. Preferably, it is provided that in the conveying region 5, the conveying system 1 comprises at least two guide rails 6 in the longitudinal transport direction 7. In particular, it can be provided that the at least two guide rails 6 of the conveying system 1 are positioned opposite and spaced apart from each other. In FIG. 6, for example in the first preferred embodiment of the conveying system 1, two guide rails 6 positioned opposite and spaced apart from each other are visible in the conveying region 5.

In particular, it can be provided that the rollers 8 are guided in the at least one guide rail 6 in the conveying region 5.

In particular, the at least one guide rail 6 can be part of the supporting structure 43.

In particular, the at least one guide rail 6 can be fastened to the supporting structure 43.

Preferably, it can be provided that the conveying system 1 comprises at least one guide rail 6 in the return region 38 for guiding the support 3 in the opposite direction from the longitudinal transport direction 7. Preferably, it can be provided that two guide rails 6 are positioned opposite and spaced apart from each other in the return region 38 to guide the support 3 in the opposite direction from the longitudinal transport direction 7. FIG. 7 shows the second detail from FIG. 5, in which, for example in the first preferred embodiment of the conveying system 1, two guide rails 6 positioned opposite and spaced apart from each other are visible in the return region 38.

Preferably, the at least one guide rail 6 can be made of metal and/or a metal alloy and/or a polymer, in particular a plastic, and/or a composite material.

Preferably, the at least one guide rail 6 can be embodied as straight.

Preferably, the at least one guide rail 6 can be positioned at least partially in the conveying region 5. Particularly preferably, the at least one guiderail 6 extends along the conveying region 5. Particularly preferably, the at least one guide rail 6 extends along the longitudinal transport direction 7 from the first transport direction changing region 15 to the second transport direction changing region 16.

It can be provided that each of the supports 3 is guided along the at least one guide rail 6 by at least one roller 8, in particular a track roller. Preferably, it can be provided that at least one roller 8, in particular a track roller, is guided along each guide rail 6. FIG. 12 shows a sectional view perpendicular to the longitudinal transport direction 7 of the second preferred embodiment of the conveying system 1 shown in FIG. 11, in which the at least one roller 8 and the at least one guide rail 6 are visible. FIG. 13 shows the image detail of the second preferred embodiment of the conveying system 1 that is identified with the reference numeral 14 in FIG. 12.

Preferably, the at least one roller 8 can be made of a polymer, in particular a plastic and/or a rubber.

In particular, the at least one castor 8 can be a heavy-duty wheel. Each individual heavy-duty wheel can have a load capacity of approximately 500 kg.

In particular, the at least one roller 8 can be made of cast polyamide.

Alternatively, the at least one roller 8 can be made of a metal, preferably a metal alloy, in particular steel.

In particular, the at least one roller 8 can have a flange. In particular, the at least one roller 8 can be embodied in the form of a flanged wheel.

Preferably, it can be provided that the revolving traction belt is mounted in a tilt-proof way at least in the conveying region 5 of the conveying system 1. This achieves the advantage that the revolving traction belt can be protected from a laterally acting force when the elongated items 2 are being placed onto or ejected from the conveying region 5.

It can preferably be provided that each of the supports 3 in the conveying region 5 is mounted in a tilt-proof way on the at least one guide rail 6.

Preferably, a protective cover 37 for the rollers 8 supporting the revolving traction belt so that it is able to move relative to the supporting structure 43 is positioned in at least one section of the conveying region 5 in the conveying system 1. This achieves the advantage that the rotating traction belt is supported in a tilt-proof way by the protective cover 37. Furthermore, this can protect the rollers 8 from debris and damage, which can further reduce the maintenance work on the conveying system 1.

FIG. 6 shows the image detail of the first preferred embodiment of the conveying system 1 identified with the reference numeral 44 in FIG. 5. FIG. 6 shows the first detail from FIG. 5 of the first preferred embodiment of the conveying system 1, wherein the protective cover 37 for the rollers 8 is shown by way of example.

Preferably, the protective cover 37 for the rollers 8 can be fastened to the support structure 43, in particular in a non-destructively detachable manner. This achieves the advantage that maintenance work on the supports 3 and the revolving traction belt can be carried out particularly easily and quickly.

In particular, it can be provided that in the operating state of the conveying system 1, the protective cover 37 is positioned above the at least one guide rail 6 in the conveying region 5. In particular, it can be provided that the protective cover 37 is part of the at least one guide rail 6. If more than at least one guide rail 6 is used, then it can preferably be provided that a protective cover 37 is positioned above each guide rail 6 in the conveying region 5. This achieves the advantage that the guide rail 6 can be protected from debris.

Preferably, the supports 3 can be positioned spaced apart from one another. In particular, it can be provided that the supports 3 are positioned at a predetermined distance from one another. In particular, the distance between the supports 3 can depend on the length of the piece goods 2 to be transported.

Preferably, it can be provided that the at least one guide rail 6 comprises at least four running surfaces 9, 10 along the longitudinal transport direction 7, whereby at least one roller 8 is guided on each running surface 9, 10 in at least some of the movably mounted supports 3 in the conveying region 5. This achieves the advantage that the plurality of movably mounted supports 3 can be guided along the at least one guide rail 6 in a particularly efficient and tilt-proof way.

Preferably, the at least one guide rail 6 can have an essentially circular cross-section for guiding the rollers 8 of the supports 3.

Preferably, it can be provided that the at least four running surfaces 9, 10 are formed by the at least one guide rail 6.

It is particularly preferable that the at least four running surfaces 9, 10 are part of the at least one guide rail 6.

Alternatively, it can be provided that the at least four running surfaces 9, 10 are indirectly connected to the at least one guide rail 6.

Preferably, it can be provided that two first running surfaces 9 of the at least four running surfaces 9, 10 are positioned opposite and spaced apart from two second running surfaces 10 of the at least four running surfaces 9, 10. This achieves the advantage that the plurality of movably mounted supports 3 can be guided along the at least one guide rail 6 in a particularly efficient and tilt-proof way.

Particularly preferably, it can be provided that the two first running surfaces 9 of the at least four running surfaces 9, 10 form a first pair of running surfaces 9 and that the two second running surfaces 10 of the at least four running surfaces 9, 10 form a second pair of running surfaces 10.

Particularly preferably, it can be provided that the two first running surfaces 9 or the first pair of running surfaces 9 is/are positioned essentially axially symmetrically to the two second running surfaces 10 or to the second pair of running surfaces 10.

Particularly preferably, it can be provided that the two first running surfaces 9 or the first pair of running surfaces 9 is/are positioned opposite from the two second running surfaces 10 or the second pair of running surfaces 10.

Preferably, it can be provided that the two first running surfaces 9 and/or the two second running surfaces 10 of the at least four running surfaces 9, 10 are positioned at an angle to one another on the at least one guide rail 6. This achieves the advantage that the support 3 can be guided along the at least one guide rail 6 in the conveying region 5 in a particularly tilt-proof way. FIG. 13 shows an example of the second preferred embodiment of the conveying system 1 with two first running surfaces 9 and two second running surfaces 10, wherein the two first running surfaces 9 are positioned at a first angle to one another on a first guide rail, the two second running surfaces 10 are positioned at a second angle to one another on a second guide rail and the angle size of the first angle corresponds to the angle size of the second angle.

Preferably, it can be provided that the angle between the two first running surfaces 9 corresponds to the angle between the two second running surfaces 10.

Preferably, it can be provided that due to the angle between the two first running surfaces 9, the two first running surfaces 9 form a first wedge. Preferably, it can be provided that due to the angle between the two second running surfaces 10, the two second running surfaces 10 form a second wedge. Particularly preferably, it can be provided that the tip of the first wedge is positioned opposite and spaced apart from the tip of the second wedge.

Particularly preferably, it can be provided that the two first running surfaces 9 or the first pair of running surfaces 9 and/or the two second running surfaces 10 or the second pair of running surfaces 10 are positioned at an angle of less than or equal to 170 degrees to one another on the at least one guide rail 6 in the conveying region 5.

Particularly preferably, it can be provided that the two first running surfaces 9 or the first pair of running surfaces 9 and/or the two second running surfaces 10 or the second pair of running surfaces 9 are positioned essentially at right angles to one another on the at least one guide rail 6. This achieves the advantage that the support 3 can be guided along the at least one guide rail 6 in the conveying region 5 in a particularly tilt-proof way.

Preferably, it can be provided that each of the supports 3 has at least one connecting device 11 for fastening the at least one traction element 4. Particularly preferably, each of the supports 3 can be fastened to the at least one traction element 4 via the at least one connecting device 11. This achieves the advantage that if a support 3 requires maintenance, the relevant support 3 can be replaced quickly and easily. FIG. 13 shows a detail view of the embodiment of the conveying system 1 shown in FIG. 12, depicting a support 3 with two connecting devices 11 for fastening two traction elements 4.

Particularly preferably, the at least one connecting device 11 can be positioned at the at least two spaced-apart fastening points 34.

Particularly preferably, the at least one connecting device 11 comprises a clamp connection for connecting the at least one traction element 4 to the support 3.

Preferably, it can be provided that the at least one connecting device 11 is positioned on at least one end surface 12 of the respective support 3 in at least some of the movably mounted supports 3. This achieves the advantage that the connecting device 11 is particularly easy to access in the event of maintenance work and consequently, repair work on the at least one support 3 can be carried out particularly easily. In addition, individual parts of the support 3 or the support 3 itself can also be replaced quickly and easily.

Preferably, it can be provided that at least two of the plurality of movably mounted supports 3 are connected to the at least one traction element 4 in such a way that, in the case of a first support, the connecting device 11 is positioned on a first end surface and, in the case of a second support, the connecting device 11 is positioned on a second end surface facing away from the first end surface. This achieves the advantage that a particularly stable and tilt-proof structure of the revolving traction belt is achieved, whereby the supports 3 are particularly securely protected from the effect of lateral force as they are guided along the at least one guide rail 6. Two supports 3 that are connected in this way to the at least one traction element 4 are not visible in FIGS. 11 to 13. For this reason, no reference numeral is used for the first support, the second support, the first end surface, and the second end surface.

Preferably, it can be provided that the conveying system 1 comprises an ejecting device 13, which is embodied to eject the elongated items 2 laterally from the supports 3 in the conveying region 5. This achieves the advantage that the conveying system 1 can be used for sorting the elongated items 2, whereby different piece goods 2 can be ejected from the supports 3 along the conveying region 5.

Particularly preferably, it can be provided that that the conveying system 1 comprises at least one ejecting device 13 along the conveying region 5. In particular, it is provided that two, preferably three, and particularly preferably four ejecting devices 13 are positioned along the conveying region 5.

Preferably, it can be provided that the ejecting device 13 of the conveying system 1 is embodied to eject the elongated items 2 on both sides of the conveying region 5. This achieves the advantage that more sorting options are available for the elongated items 2 during a sorting process of the conveying system 1, resulting in several options for forming a sorting line.

Preferably, the ejecting device 13 can comprise a kicker element which is embodied to eject the elongated items 2 laterally from the supports 3.

Preferably, the kicker element can be part of the ejecting device 13.

Preferably, the ejecting device 13 of the conveying system 1 can be embodied in the form of an eccentric pusher and/or a rotary pusher. This can be provided particularly when the conveying system 1 is used as a presorting top puller. In this case, it can preferably be provided that linear push-off devices eject the elongated items from the supports 3.

It is particularly preferable for the ejecting device 13 to be embodied as essentially horseshoe-shaped or U-shaped.

Particularly preferably, the ejecting device 13 can be supported so that is able to rotate along an axis aligned in the longitudinal transport direction 7.

Particularly preferably, the ejecting device 13 comprises three positions, wherein in a first position the ejecting device 13 is in a neutral position, in a second position the ejecting device 13 ejects the elongated items 2 from the supports 3 and out of the conveying region 5 on a first side, and in a third position the ejecting device 13 ejects the elongated items 2 from the supports 3 and out of the conveying region 5 on a second side.

Figure 8:
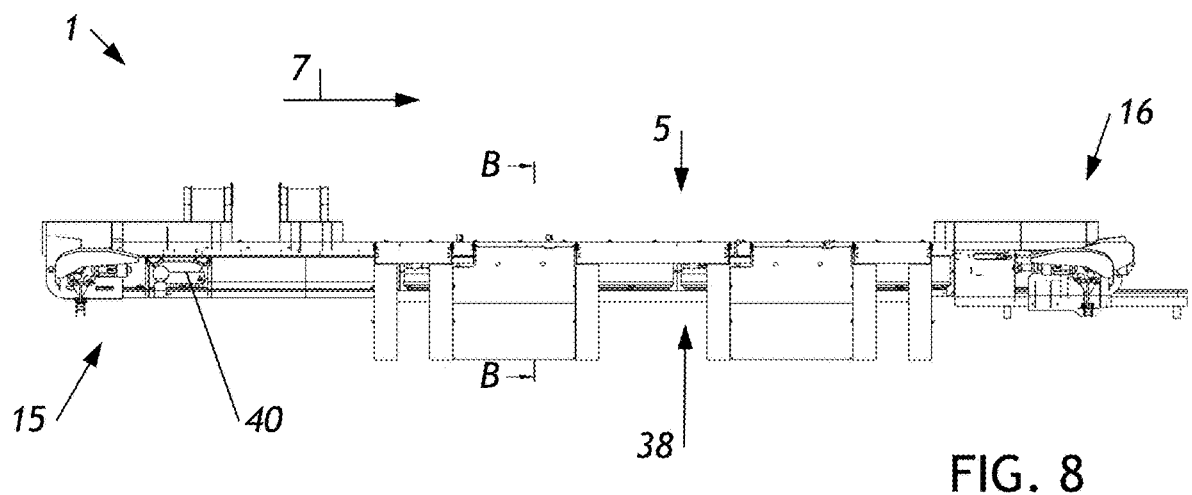
FIG. 8 shows a side view of the first preferred embodiment of the conveying system shown in FIG. 1.
Figure 9:
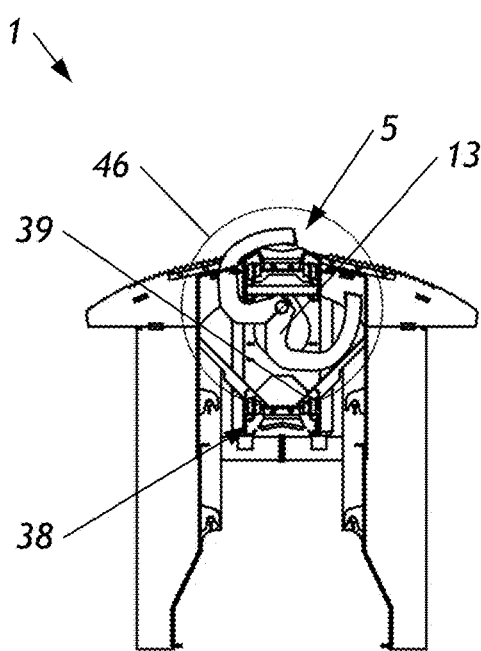
FIG. 9 shows a sectional view along line BB through the first preferred embodiment of the conveying system shown in FIG. 8.

In particular, it can be provided that the supports 3 are mounted in a tilt-proof way in at least one ejection region of the ejecting device 13. Preferably, the ejection region 13 is a region in the immediate vicinity of the ejecting device 13. Preferably, it can be provided that the ejection region of the ejecting device 13 extends away from the ejecting device 13 by a piece length of the elongated items 2 to be transported by the conveying system 1, in particular in the longitudinal transport direction 7 and/or in the opposite direction from the longitudinal transport direction 7. FIG. 8 shows a side view of the first preferred embodiment of the conveying system 1. Furthermore, FIG. 8 shows the section line B-B in the ejection region, which section line B-B indicates a section perpendicular to the longitudinal transport direction 7. FIG. 9 shows the section B-B of the section line B-B shown in FIG. 8. FIG. 9 also shows an example of the kicker element, which is embodied to eject the elongated items 2 laterally from the supports 3.

Figure 10:
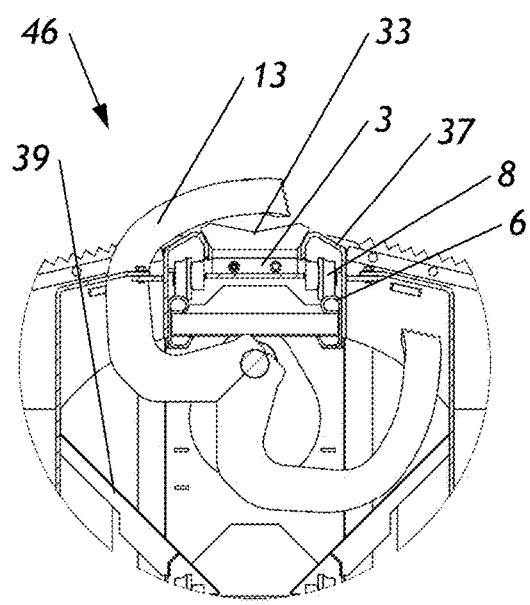
FIG. 10 shows a detail from FIG. 9 of the first preferred embodiment of the conveying system.

In particular, it can be provided that the debris guide 39 is positioned in a region of the conveying system 1 in which the ejecting device 13 is also positioned. In particular, the debris guide 39 can be positioned in the ejection region of the conveying system 1. FIG. 10 shows the image detail of the first preferred embodiment of the conveying system 1 identified with the reference numeral 46 in FIG. 9. The debris guide 39 and the ejecting device 13 are shown by way of example in FIG. 10.

In particular, the debris guide 39 can be positioned before the ejecting device 13 and/or after the ejecting device 13, viewed in the longitudinal transport direction 7.

In particular, the debris guide 39 can be fastened to the support structure 43.

Preferably, it can be provided that the conveying system 1 comprises a traction belt cleaning device 40 for cleaning the revolving traction belt, which traction belt cleaning device 40 is positioned in the return region 38. This achieves the advantage that the revolving traction belt can be cleaned, whereby the debris transported in the return region 38 can be removed by means of the traction belt cleaning device.

In particular, the traction belt cleaning device can comprise a sweeping device for sweeping debris out of the revolving traction belt in the return region 38.

Preferably, the traction belt cleaning device can be embodied to take debris from the revolving traction belt in the return region 38 by means of sweeper scoops and discharge it into a disposal conveyor 42.

In particular, in an operating state of the conveying system 1, the disposal conveyor 42 can be positioned laterally offset from the revolving traction belt and/or at least partially below the revolving traction belt. In FIG. 3, for example, the first preferred embodiment of the conveying system 1 is shown as part of a sorting system in an axonometric depiction in which at least parts of the sorting system with the disposal conveyor 42 are shown.

In particular, the traction belt cleaning device can be positioned before the first direction changing device of the first transport direction changing region 15, viewed in the longitudinal transport direction 7.

In particular, the traction belt cleaning device can be positioned after the second direction changing device of the second transport direction changing region 16, viewed in the longitudinal transport direction 7.

FIGS. 1 to 10 show at least parts of the first preferred embodiment of the conveying system 1. In the first preferred embodiment of the conveying system 1, it is in particular provided that multiple supports 3 are connected to the revolving traction belt by means of at least one traction element 4, that each of the supports 3 has a recess 33 for the elongated items to be placed onto, that each of the supports 3 is fastened to the at least one traction element 4 in at least two fastening points 34 spaced apart from each other, and that the revolving traction belt is supported so that it is able to move relative to the supporting structure 43 by means of rollers 8 at least in one conveying region 5 of the conveying system 1.

Furthermore, FIGS. 11 to 13 show at least parts of the second preferred embodiment of the conveying system 1 for longitudinally transporting elongated items 2 by means of a plurality of movably mounted supports 3, wherein the multiple supports 3 are connected to a revolving traction belt by means of at least one traction element 4, wherein the conveying system 1 comprises at least one guide rail 6 in the longitudinal transport direction 7 in a conveying region 5, wherein each support 3 comprises at least one roller 8 for guiding the support 3 along the at least one guide rail 6, and that each support 3 in the conveying region 5 is mounted in a tilt-proof way on the at least one guide rail 6. The tilt-proof mounting of each support 3 on the at least one guide rail 6 in the conveying region 5 particularly results in the advantage of achieving an efficient and safe operation of the conveying system 1 with a simultaneously high conveying capacity.

Preferably, it can be provided that the conveying system 1 is part of a sorting system.

A sorting system is a system that is embodied to sort various elongated items 2 according to predefined criteria.

Unsorted elongated items 2 are preferably received by the sorting system on the input side and sorted and delivered on the output side.

The elongated items 2 are preferably received by the sorting system on the input side in the transverse transport.

The elongated items 2 are preferably sorted by the sorting system in the longitudinal transport.

FIGS. 1 to 16 show examples of at least parts of the sorting system; FIGS. 1 to 16 do not show the whole the sorting system.

The elongated items 2 to be transported by the conveying system 1 are preferably accepted by the sorting system on the input side in the transverse transport.

The sorting system can preferably include a deflecting device 17 in order to deliver unsorted elongated items 2 to the conveying system 1.

Preferably, the elongated items 2 can be diverted from the transverse transport to the longitudinal transport by means of the deflecting device 17. Preferably, the elongated items 2 can be transferred to the conveying system 1 by means of the deflecting device 17.

Furthermore, the sorting system can preferably comprise at least one storage unit 31, with the sorted piece goods preferably being deposited in the at least one storage unit 31. In particular, the storage unit 31 can also be referred to as a sorting container or sorting box.

In particular, it can be provided that the sorted piece goods are stored in several storage units 31. It can preferably be provided that the storage units 31 have different longitudinal spans.

In particular, it can be provided that the at least one storage unit 31 is embodied in such a way that the length of the elongated items 2 corresponds to the length of the at least one storage unit 31.

Preferably, the at least one storage unit 31 can be positioned next to the conveying system 1 in the longitudinal transport direction 7.

Particularly preferably, the at least one storage unit 31 can have a piece goods receiving opening 32. In particular, it can be provided that an end region of the elongated item 2 is positioned in the piece goods receiving opening 32. The storage unit 31 and the piece goods receiving unit 31 of the sorting system are visible in FIG. 3 and FIG. 5, for example, in the first preferred embodiment of the conveying system 1 and in FIG. 11 and FIG. 12, for example, in the second preferred embodiment of the conveying system 1.

Preferably, it can be provided that the sorting system further comprises a deflecting device 17 for elongated items 2, that the deflecting device 17 has a receiving region 18, that the receiving region 18 is embodied to receive the elongated items 2 on the input side in the transverse transport and to discharge the elongated items 2 on the output side in the longitudinal transport, that the deflecting device 17 comprises at least two belt-shaped conveyors 19, 20 positioned at an angle to one another in the longitudinal transport direction 7, wherein the at least two belt-shaped conveyors 19, 20 span the receiving region 18 in an operating state of the deflecting device 17.

This achieves the advantage that elongated items or an elongated item 2 can be transferred from the transverse transport to the longitudinal transport in such a way that the gaps between the elongated items 2 are as uniform as possible. This significantly reduces the control effort required to standardize the gaps between the elongated items 2 in a longitudinal sorting section following the deflecting device 1. Due to the embodiment and positioning of the belt-shaped conveyors 19, 20, elongated items 2 can be transferred from the transverse transport to the longitudinal transport more quickly and with shorter time intervals between the elongated items 2 since the gaps between the elongated items 2 are already embodied as essentially uniform when the elongated items 2 are transferred from the transverse transport to the longitudinal transport. As a result, the conveying process can be significantly accelerated, especially when feeding an elongated item 2 in from one side of the deflecting device 17. The receiving region 18 also has the advantage that the gaps between elongated items 2 of different dimensions are embodied as essentially uniform since the elongated items 2 come into contact more quickly and with a larger area of the at least two belt-shaped conveyors 19, 20 when they are transferred from the transverse transport to the longitudinal transport. As a result, the elongated items 2 are centered more quickly in the longitudinal transport direction 7 and are therefore transported more quickly out of the receiving region 18. In addition, the receiving region 18 and the conveying of the elongated items 2 on the at least two belt-shaped conveyors 19, 20 do not cause any leading edges to be formed. As a result, the elongated items 2 cannot collide with the side plates of the deflecting device 17, which means that the conveying speed of the elongated items 2 is not reduced. This also advantageously prevents a pendulum movement of the elongated items 2 when the elongated item 2 is received from the transverse conveyor. This has proven to have a particularly efficiency-increasing effect for the conveying process, particularly with shorter piece goods 2. Furthermore, the formation of the receiving region 18 by means of the at least two belt-shaped conveyors 19, 20 eliminates the need for oil lubrication on exposed components of the deflecting device 17. This elimination of oil lubrication means that no oil can escape into the environment through the deflecting device 17 itself at the installation site of the deflecting device 17.

In this connection, it has been demonstrated that the sorting system can be operated particularly well if the conveying system 1 is combined with the deflecting device 17. The combination of the conveying system 1 with the deflecting device 17 results in synergy effects, whereby after the elongated items 2 are deflected from the transverse transport to the longitudinal transport, the elongated items can be delivered to the conveying system 1 in particularly precise and efficient way. As a result, the elongated items 2 can be received particularly well by the conveying system 1, making it possible to ensure a rapid and precise transfer of the elongated items 2 to the supports 3 of the conveying system 1.

In principle, the deflecting device 17 could also be operated with a conveying system 1 other than the one described here.

Preferably, the deflecting device 17 is embodied to achieve an environmentally friendly and harmonized transfer of elongated items 2 from the transverse transport to the longitudinal transport.

Figure 14:
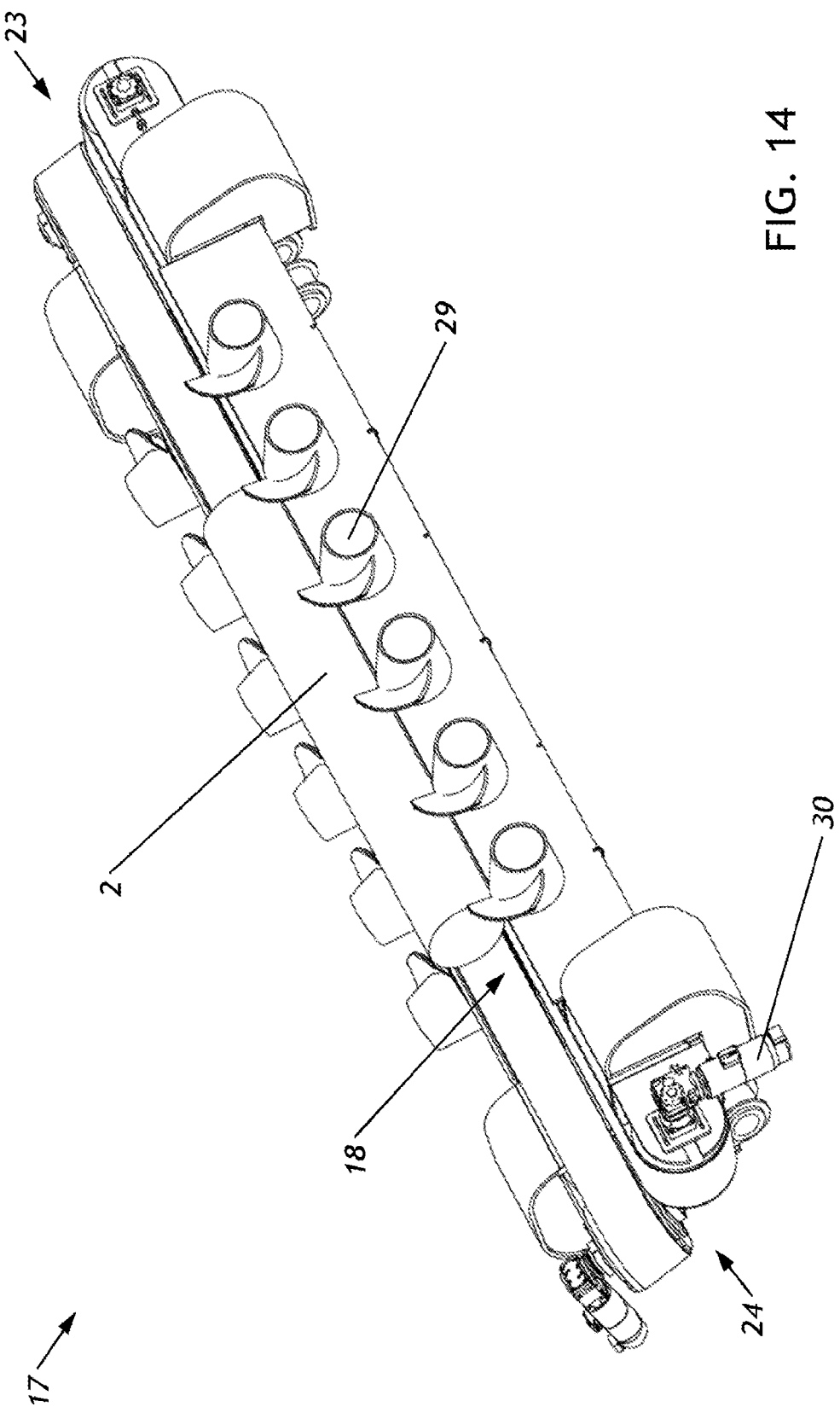
FIG. 14 is an axonometric view of a preferred embodiment of a deflecting device of a sorting system for elongated items.
Figure 15:
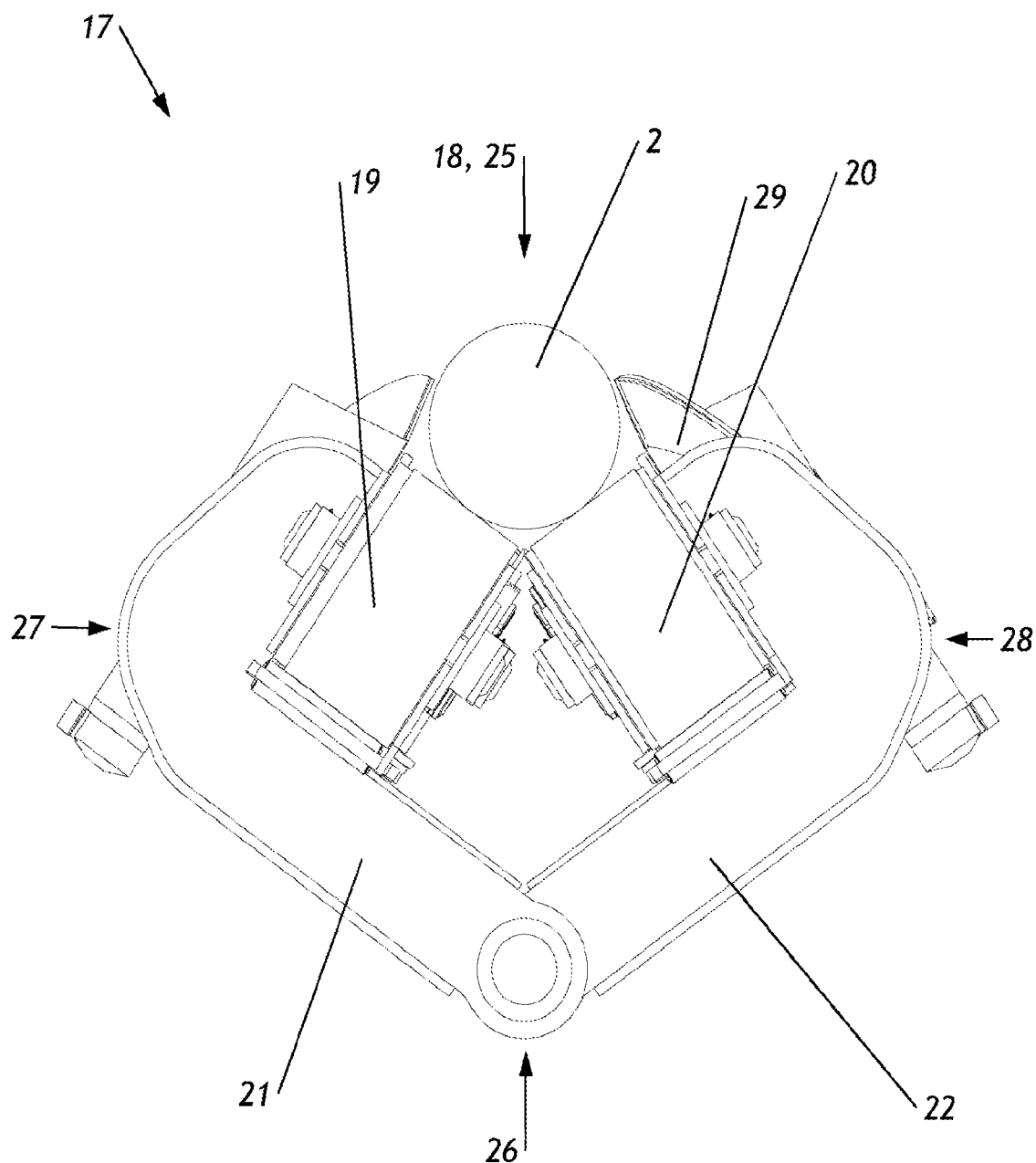
FIG. 15 shows a front view of the preferred embodiment of the deflecting device of the sorting system for elongated items.
Figure 16:
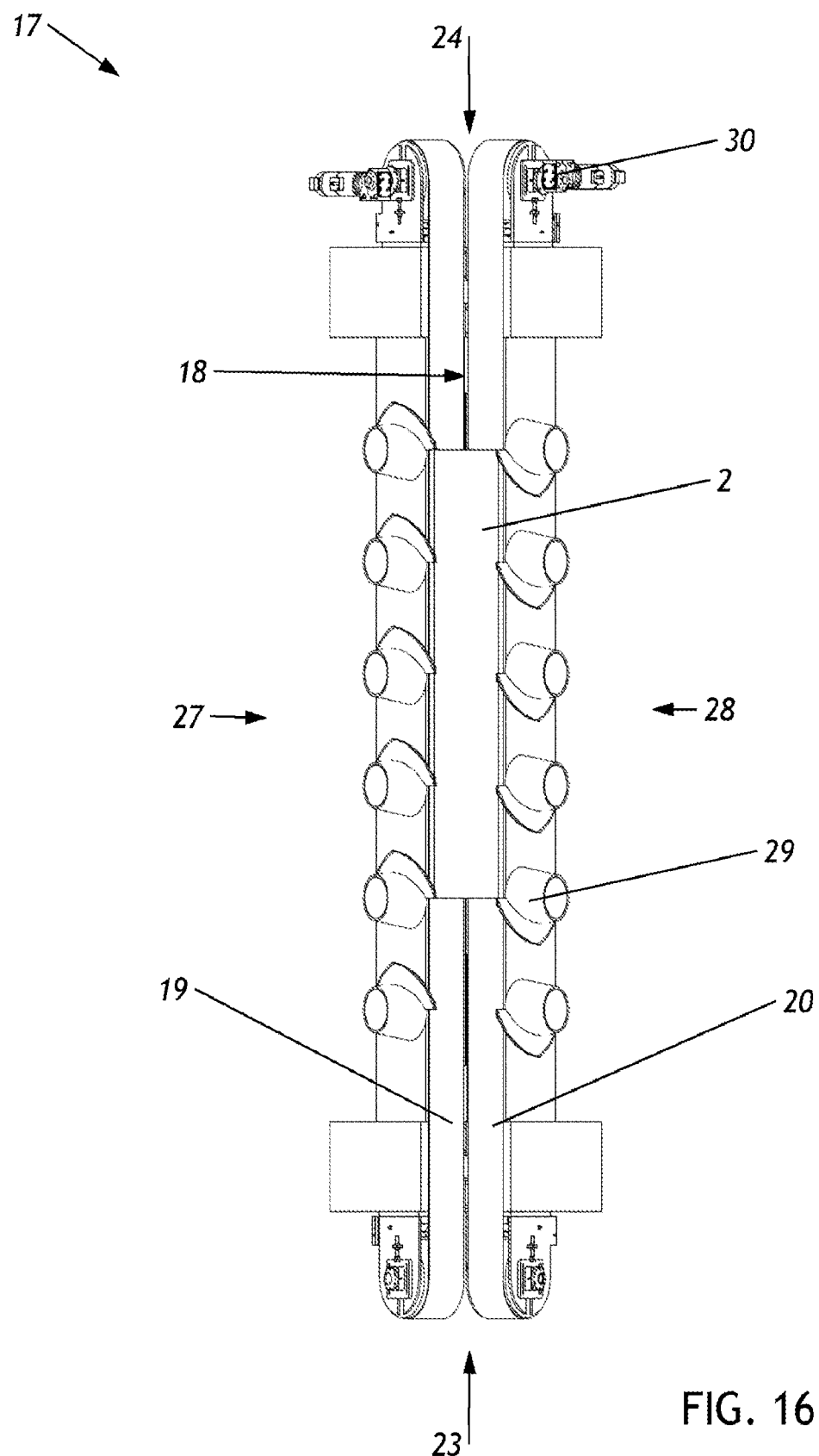
FIG. 16 shows the plan view of the preferred embodiment of the deflecting device of the sorting system for elongated items.

FIGS. 14 to 16 show at least parts of a preferred embodiment of a deflecting device 17 for elongated items 2, wherein the deflecting device 17 has a receiving region 18, wherein the receiving region 18 is embodied to receive the elongated items 2 on the input side in the transverse transport and to discharge the elongated items 2 on the output side in the longitudinal transport, wherein the deflecting device 17 comprises at least two belt-shaped conveyors 19, 20 positioned at an angle to one another in the longitudinal transport direction 7, and wherein the at least two belt-shaped conveyors 19, 20 span the receiving region 18 in an operating state of the deflecting device 17.

The deflecting device 17 is a device which is embodied to receive elongated items 2 on the input side in the transverse transport and to discharge the elongated items 2 on the output side in the longitudinal transport.

The term "transverse transport" is preferably understood to mean a transport of the elongated items 2 in the direction orthogonal to the longitudinal transport direction 7 of the elongated items 2.

The term "longitudinal transport" is preferably understood to mean a transport of the elongated items 2 in the direction of the longitudinal direction of the elongated items 2.

The deflecting device 17 can also be referred to as a conveying device. Preferably, the direction in which the elongated items 2 is discharged or transported in the longitudinal transport is the longitudinal transport direction 7.

Preferably, the deflecting device 17 is embodied to change the conveying direction of the elongated items 2. Particularly preferably, the conveying direction is the direction in which the elongated items 2 is conveyed or transported. Preferably, it can be provided that the conveying direction of the deflecting device 17 is different on the input and output sides.

Preferably, the conveying direction of the deflecting device 17 on the input side is orthogonal to the longitudinal direction of the deflecting device 17.

Particularly preferably, the conveying direction of the deflecting device 17 on the input side is orthogonal to the longitudinal direction of the elongated item 2.

Preferably, the conveying direction of the deflecting device 17 on the output side is oriented in the longitudinal transport direction 7 of the deflecting device 17.

It is provided that the deflecting device 17 has a receiving region 18. The receiving region 18 is preferably embodied to receive the elongated items 2. Preferably, the elongated items 2 are transferred to the receiving region 18 from the transverse transport of a transverse transporter. Since a person skilled in the art is familiar with the term "transverse transporter", it is not necessary to enumerate or describe different transverse transporters here.

In particular, the elongated items 2 are received on the input side by a feeder in the transverse transport.

In particular, the feeder can be a transverse transporter.

Preferably, the dead weight of the elongated items 2 and its gravitational acceleration are used for the transfer of the elongated items 2 from the transverse transport to the longitudinal transport.

Particularly preferably, the receiving region 18 is open at the top in the operating state of the deflecting device 17. Preferably, the receiving region 18 of the deflecting device 17 is an opening, which opening is positioned facing away from the ground in the operating state of the deflecting device 17.

When designating the receiving region 18 as a receiving space, it is preferably provided that the receiving space is not a closed space. Preferably, the receiving space is open at the top in the operating state of the deflecting device 17.

FIG. 15 shows an example of the preferred embodiment of the deflecting device 17 with an elongated item 2, which has been received in the receiving region 18 of the deflecting device 17.

Preferably, the deflecting device 17 has a first and a second end region 23, 24, wherein the elongated items 2 are transferred in the first end region 23 of the deflecting device 17 in the longitudinal transport, in particular to the conveying system 1 for longitudinally transporting elongated items 2, wherein the second end region 24 of the deflecting device 17 is positioned opposite and spaced apart from the first end region 23 of the deflecting device 17. FIG. 14 shows an example of the preferred embodiment of the deflecting device 17 with the first and second end regions 23, 24.

Preferably, the deflecting device 17 has an upper side 25, on which upper side 25 the elongated items 2 is transported.

Preferably, the deflecting device 17 has a lower side 26 that is positioned opposite and spaced apart from the upper side 25 of the deflecting device 17.

Preferably, the deflecting device 17 has a first transverse side 27 and a second transverse side 28, wherein on the input side in the transverse transport, the elongated items 2 can be received on the first transverse side 27 and/or on the second transverse side 28.

FIG. 15 shows an example of the preferred embodiment of the deflecting device 17 with the upper side 25, the lower side 26, the first transverse side 27, and the second transverse side 28.

It is provided that the at least two belt-shaped conveyors 19, 20 span the receiving region 18 in an operating state of the deflecting device 17.

In particular, it can be provided that the conveying direction of the belt-shaped conveyors 19, 20 is oriented in the longitudinal transport direction 7.

In particular, conveyors that comprise conveyor surfaces that move in the longitudinal transport direction 7 can be regarded as belt-shaped conveyors.

In particular, it can be provided that the elongated items 2 are transported on the conveyor surfaces that move in the longitudinal transport direction 7.

Preferably, the belt-shaped conveyors 19, 20 can be mechanical conveyors.

Particularly preferably, the belt-shaped conveyors 19, 20 can preferably be belt conveyors and/or chain conveyors.

In particular, the belt-shaped conveyors 19, 20 can comprise conveyor belts for transporting the elongated items 2.

In particular, the belt-shaped conveyors 19, 20 can comprise conveyor chains for transporting the elongated items 2.

Preferably, the elongated items 2 are transported or conveyed with the at least two belt-shaped conveyors 19, 20.

Preferably, the at least two belt-shaped conveyors 19, 20 have the same conveyor width.

Alternatively, it can be provided that the at least two belt-shaped conveyors 19, 20 have different conveyor widths.

Preferably, the at least two belt-shaped conveyors 19, 20 comprise at least one drive unit. Preferably, the at least two belt-shaped conveyors 19, 20 each comprise at least one drive unit. In particular, it is provided that the at least two belt-shaped conveyors 19, 20 are driven by the at least one drive unit. Preferably, the at least one drive unit can comprise at least one motor, in particular an electric motor, for driving the at least two belt-shaped conveyors 19, 20.

Preferably, the at least one drive unit can comprise at least one geared motor for driving the at least two belt-shaped conveyors 19, 20.

It is particularly preferable that the belt-shaped conveyors 19, 20 move at essentially the same speed.

When the at least two belt-shaped conveyors 4, 5 are embodied in the form of belt conveyors, it can be provided that the at least one drive unit of the at least two belt-shaped conveyors 19, 20 comprises a roller unit for guiding the at least two belt-shaped conveyors 19, 20 along the longitudinal transport direction 7.

Preferably, it can be provided that the deflecting device 17 comprises exactly two belt-shaped conveyors 19, 20 positioned at an angle to each other. Particularly preferably, it can be provided that the deflecting device 17 comprises exactly two belt-shaped conveyors 19, 20 positioned at a predefined angle to each other. FIGS. 14 to 16 show an example of the preferred embodiment of the deflecting device 17 with two belt-shaped conveyors 19, 20.

The operating state of the deflecting device 17 is preferably a state in which elongated items 2 are being received by the deflecting device 17 on the input side in the transverse transport and discharged on the output side in the longitudinal transport.

Preferably, the receiving region 18 is formed by at least two belt-shaped conveyors 19, 20.

Particularly preferably, it can be provided that the at least two belt-shaped conveyors 19, 20 comprise at least one cushioning device. Preferably, the at least one cushioning device is embodied to cushion an impact of the elongated items 2 against the at least two belt-shaped conveyors 19, 20. This achieves the advantage of allowing the elongated items 2 to be accelerated more quickly in the longitudinal transport direction 7.

In particular, the at least one cushioning device can be embodied by means of the at least two belt-shaped conveyors 19, 20 themselves.

In particular, the at least one cushioning device can be embodied in the roller unit of the at least two belt-shaped conveyors 19, 20. In this case, it can preferably be provided that the roller unit comprises at least one hydraulic cushioning device and/or at least one friction cushioning device.

Preferably, it can be provided that at least one conveyor wheel 29 for accelerating the elongated items 2 along the conveying direction is positioned on the first transverse side 27 and/or on the second transverse side 28 of the deflecting device 17.

Particularly preferably, the first transverse side 27 and/or the second transverse side 28 of the deflecting device 17 is embodied to accept the elongated items 2 on the input side in the transverse transport.

Preferably, the deflecting device 17 comprises multiple conveyor wheels 29 along the longitudinal transport direction 7 for accelerating the elongated items 2 along the transport direction.

Preferably, the at least one conveyor wheel 29 can be embodied to accelerate the elongated items 2 along the conveying direction.

Particularly preferably, the at least one conveyor wheel 29 can be screw-shaped and/or conical.

Particularly preferably, the at least one conveyor wheel 29 can be embodied to accelerate the elongated items 2 along the conveying direction even before contact with the at least two belt-shaped conveyors 19, 20.

Since the receiving region 18 of the deflecting device 17 receives the elongated items 2 on the input side in the transverse transport and there is essentially no longitudinal acceleration of the elongated items 2 during the transverse transport of the elongated items 2, the acceleration of the elongated items 2 by means of the at least one conveyor wheel 29 is understood to be an acceleration of the elongated items 2 in the longitudinal transport direction 7 during the transfer of the elongated items 2 from the transverse transport to the longitudinal transport.

Preferably, the elongated items 2 are accelerated in the longitudinal transport direction 7 by means of the at least one conveyor wheel 29 when the elongated items 2 are received on the input side. Preferably, the elongated items 2 are accelerated in the longitudinal transport direction 7 before the elongated items 2 come into contact with at least one of the at least two belt-shaped conveyors 19, 20.

Preferably, it can be provided that a V-shaped profile of the receiving region 18 is spanned by the at least two belt-shaped conveyors 19, 20. This achieves the advantage that a particularly slip-minimized longitudinal acceleration of the elongated items 2 is achieved when the elongated items 2 are transferred from the transverse transport to the longitudinal transport. Furthermore, this also achieves the advantage that, especially with shorter elongated items 2, there is no oscillating movement when the elongated items 2 are received into the receiving region 18.

Preferably, the V-shaped profile of the receiving region 18 is formed by the at least two belt-shaped conveyors 19, 20.

Particularly preferably, the V-shaped profile of the receiving region 18 can be open at the top in the operating state of the deflecting device 17.

Preferably, it can be provided that the receiving region 18 is delimited only by the at least two belt-shaped conveyors 19, 20. This achieves the advantage that the elongated items 2 can be received particularly well by the receiving region 18, wherein the elongated items 2 can come into contact particularly quickly with a larger area of the at least two belt-shaped conveyors 19, 20.

Particularly preferably, it can be provided that the receiving region 18 is delimited toward the bottom by the at least two belt-shaped conveyors 19, 20 in the operating state of the deflecting device 17.

Particularly preferably, it can be provided that the receiving region 18 is delimited exclusively by the at least two belt-shaped conveyors 19, 20.

Preferably, it can be provided that the at least two belt-shaped conveyors 19, 20 are positioned at an angle to one another of greater than or equal to 60 degrees, preferably greater than or equal to 80 degrees, and particularly preferably greater than or equal to 100 degrees. This achieves the advantage that the elongated items 2 can be received particularly efficiently by the receiving region 18, whereby a particularly rapid centering of the elongated items 2 is achieved and whereby a minimized-slip longitudinal acceleration is achieved.

Preferably, it can be provided that the at least two belt-shaped conveyors 19, 20 are positioned at an angle to one another of less than or equal to 180 degrees, preferably less than or equal to 160 degrees, and particularly preferably less than or equal to 140 degrees. This achieves the advantage that the elongated items 2 can be received particularly efficiently by the receiving region 18, whereby a particularly rapid centering of the elongated items 2 is achieved and whereby a minimized-slip longitudinal acceleration is achieved.

Preferably, it can be provided that the at least two belt-shaped conveyors 19, 20 are positioned at an angle of essentially 110 degrees to one another. This achieves the advantage that the elongated items 2 can be received particularly efficiently by the receiving region 18, whereby a particularly rapid centering of the elongated items 2 is achieved and whereby a particularly good minimized-slip longitudinal acceleration is achieved.

In particular, the angle at which the two belt-shaped conveyors 19, 20 are positioned relative to each other is the angle which is enclosed on a plane perpendicular to the long transport direction 7 in the operating state of the deflecting device 17 by a first tangent on a first surface of the at least two belt-shaped conveyors 19, 20 and a second tangent on a second surface of the at least two belt-shaped conveyors 19, 20.

Preferably, it can be provided that the at least two belt-shaped conveyors 19, 20 are locked in position in the operating state of the deflecting device 17, wherein at least one belt-shaped conveyor 19 of the at least two belt-shaped conveyors 19, 20 can be pivoted into a maintenance position in a maintenance state of the deflecting device 17. This achieves the advantage that maintenance work on the at least two belt-shaped conveyors 19, 20 or maintenance of the deflecting device 17 is significantly simplified and can be carried out more quickly compared to currently known deflecting devices 17.

Preferably, it can be provided that the deflecting device 17 comprises at least one articulation.

Preferably, it can be provided that at least one first belt-shaped conveyor 19 of the at least two belt-shaped conveyors 19, 20 is fastened to at least one first fastening arm 21. This achieves the advantage that the maintenance and maintenance work on the at least two belt-shaped conveyors 19, 20 and/or the maintenance of the deflecting device 17 is significantly simplified compared to currently known deflecting devices 17.

Preferably, it can be provided that at least one second belt-shaped conveyor 20 of the at least two belt-shaped conveyors 19, 20 is fastened to at least one second fastening arm 22.

Preferably, it can be provided that the at least two belt-shaped conveyors 19, 20 are locked in position in the operating state of the deflecting device 17, wherein the first belt-shaped conveyor 19 and/or the second belt-shaped conveyor 20 of the at least two belt-shaped conveyors 19, 20 can be pivoted into a maintenance position in the maintenance state of the deflecting device 17.

Preferably, it can be provided that the at least one first fastening arm 21 is mounted so that it is able to pivot relative to at least one second belt-shaped conveyor 20 of the at least two belt-shaped conveyors 19, 20 in order to pivot out into the maintenance position of the deflecting device 17. This achieves the advantage that the maintenance and maintenance work on the at least two belt-shaped conveyors 19, 20 and/or the maintenance of the deflecting device 17 is significantly simplified compared to currently known deflecting devices 17.

Particularly preferably, the at least one first fastening arm 21 can be pivotable relative to the at least one second fastening arm 22, in particular by means of the at least one articulation.

Particularly preferably, it can be provided that the deflecting device 17 comprises at least one hydraulic unit 30 for pivoting the at least one first fastening arm 21 into the maintenance position of the deflecting device 17.

In particular, the at least one hydraulic unit 30 can be positioned in the first end region 23 and/or in the second end region 24 of the deflecting device 17.

In particular, the at least one hydraulic unit 30 can be positioned on the at least one drive unit of the at least two belt-shaped conveyors 19, 20.

Particularly preferably, it can be provided that the two belt-shaped conveyors 19, 20 support each other at least indirectly. FIG. 15 shows a front view of a preferred embodiment of the deflecting device 17 in which it is evident that the two belt-shaped conveyors 19, 20 support each other at least indirectly.

Preferably, it can be provided that the at least two fastening arms 21, 22 are mounted so that they are able to pivot-particularly at the at least one articulation—by an angle of less than 100 degrees, preferably by an angle of less than 80 degrees, and particularly preferably by an angle of less than 60 degrees. This achieves the advantage that the parts of the deflecting device 17 are easier to access, which facilitates maintenance work on the deflecting device 17.

Preferably, it can be provided that the at least two fastening arms 21, 22 are mounted so that they are able to pivot-particularly at the at least one articulation—by an angle of greater than 10 degrees, preferably by an angle of greater than 20 degrees, and particularly preferably by an angle of greater than 30 degrees. This achieves the advantage that the parts of the deflecting device 17 are easier to access, which facilitates maintenance work on the deflecting device 17.

Preferably, it can be provided that the at least two fastening arms 21, 22 are mounted so that they are able to pivot-particularly at the at least one articulation—by an angle of essentially 35 degrees. This achieves the advantage that the parts of the deflecting device 17 are particularly easy to access, which particularly facilitates maintenance work on the deflecting device 17.

Preferably, it can be provided that the at least one articulation comprises an axis that is oriented parallel to the conveying direction.

The following are principles for understanding and interpreting the present disclosure.

Features are usually introduced with an indefinite article "a, an". Unless the context indicates otherwise, therefore, "a" and "an" should not be understood as number words.

The conjunction "or" is to be interpreted as inclusive and not exclusive. Unless the context indicates otherwise, "A or B" also includes "A and B", whereby "A" and "B" represent any features.

An ordinal number word, for example "first", "second", or "third" is used in particular to differentiate a feature X or a subject matter Y in several embodiments, unless otherwise defined by the disclosure of the invention. In particular, a feature X or subject matter Y with an ordinal number in a claim does not mean that an embodiment of the invention falling within the scope of this claim must have a further feature X or a further subject matter Y.

The use of "essentially" in connection with a numerical value includes a tolerance of +10% around the specified numerical value, unless the context indicates otherwise.

For value ranges, the end points are included unless the context indicates otherwise.

The invention claimed is:

1. A conveying system for longitudinally transporting elongated items, comprising:
   a revolving traction belt comprising at least one traction element and having an upper side; and
   a supporting structure for the revolving traction belt;
   wherein multiple supports are connected to the revolving traction belt by the at least one traction element;
   wherein each of the supports has a recess for placing the elongated items on;
   wherein each of the supports is fastened to the at least one traction element in at least two spaced-apart fastening points on the upper side of the belt;
   wherein each of the supports comprises a support unit for the elongated items;
   wherein the support unit has the recess for the elongated items;
   wherein the revolving traction belt is supported by rollers to enable movement relative to the supporting structure at least in a conveying region of the conveying system;
   wherein the at least one traction element is composed of segments, the segments being detachably coupled to one another by a connector;
   wherein each of the supports comprises a base body; and
   wherein each support unit is fastened to the base body of each support.

2. The conveying system according to claim 1, wherein each support unit of the supports is connected to the base body of the supports in a form-fitting manner.

3. The conveying system according to claim 1, wherein the revolving traction belt is mounted in a tilt-proof manner at least in the conveying region of the conveying system.

4. The conveying system according to claim 1, wherein the rollers are positioned on the revolving traction belt.

5. The conveying system according to claim 1, wherein the base body of each support comprises extensions for the rollers.

6. The conveying system according to claim 1, wherein:
   each of the supports comprises at least two rollers for supporting the revolving traction belt; and
   the at least two rollers of each support are guided in two guide rails in a longitudinal transport direction.

7. The conveying system according to claim 1, wherein the at least one traction element comprises a composite material.

8. The conveying system according to claim 1, wherein a connecting line through the at least two fastening points is oriented transversely to the longitudinal transport direction of the conveying system.

9. The conveying system according to claim 8, wherein the connecting line through the at least two fastening points is oriented orthogonally to the longitudinal transport direction of the conveying system.

10. The conveying system according to claim 1, wherein a protective cover for the rollers supporting the revolving traction belt is positioned in at least one section of the conveying region in the conveying system.

11. The conveying system according to claim 1, wherein the conveying system comprises an ejecting device configured to eject the elongated items laterally from the supports in the conveying region.

12. A conveying system for longitudinally transporting elongated items, comprising:
- a revolving traction belt comprising at least one traction element; and
- a supporting structure for the revolving traction belt;
- wherein multiple supports are connected to the revolving traction belt by the at least one traction element;
- wherein each of the supports has a recess for placing the elongated items on;
- wherein each of the supports is fastened to the at least one traction element in at least two spaced-apart fastening points;
- wherein each of the supports comprises a support unit for the elongated items;
- wherein the support unit has the recess for the elongated items;
- wherein the revolving traction belt is supported by rollers to enable movement relative to the supporting structure at least in a conveying region of the conveying system;
- wherein the at least one traction element is composed of segments, the segments being detachably coupled to one another by a connector;
- wherein each of the supports comprises a base body;
- wherein each support unit is fastened to the base body of each support; and
- wherein:
    - the conveying system comprises a return region positioned opposite and spaced apart from the conveying region; and
    - the conveying system comprises a debris guide for diverting debris from the conveying region into the return region.

13. The conveying system according to claim 12, wherein the conveying system comprises a traction belt cleaning device configured to clean the revolving traction belt, the traction belt cleaning device being positioned in the return region.

14. A sorting system, comprising:
- at least one conveying system for longitudinally transporting elongated items, the at least one conveying system including:
    - a revolving traction belt; and
    - a supporting structure for the revolving traction belt;
- wherein multiple supports are connected to the revolving traction belt by at least one traction element;
- wherein each of the supports has a recess for placing the elongated items on;
- wherein each of the supports is fastened to the at least one traction element in at least two spaced-apart fastening points;
- wherein each of the supports comprises a support unit for the elongated items;
- wherein the support unit has the recess for the elongated items;
- wherein the revolving traction belt is supported by rollers to enable movement relative to the supporting structure at least in a conveying region of the conveying system;
- wherein the at least one traction element is composed of segments, the segments being detachably coupled to one another by a connector;
- wherein each of the supports comprises a base body; and
- wherein each support unit is fastened to the base body of each support.

15. The sorting system according to claim 14, further comprising:
- a deflecting device for the elongated items, the deflecting device comprising:
    - a receiving region configured to receive the elongated items on an input side in a transverse transport and to discharge the elongated items on an output side in a longitudinal transport; and
    - at least two belt-shaped conveyors positioned at an angle to one another in a longitudinal transport direction, the at least two belt-shaped conveyors spanning the receiving region in an operating state of the deflecting device.

* * * * *